United States Patent
Czysz

(10) Patent No.: US 7,207,585 B2
(45) Date of Patent: Apr. 24, 2007

(54) FRONT SUSPENSION FOR MOTORCYCLE

(75) Inventor: Michael Czysz, Portland, OR (US)

(73) Assignee: MotoCzysz LLC, Portland, OR (US)

( * ) Notice: Subject to any disclaimer, the term of this patent is extended or adjusted under 35 U.S.C. 154(b) by 0 days.

(21) Appl. No.: 11/050,377

(22) Filed: Feb. 2, 2005

(65) Prior Publication Data
US 2005/0127636 A1 Jun. 16, 2005

Related U.S. Application Data

(63) Continuation-in-part of application No. 10/633,381, filed on Jul. 31, 2003, now Pat. No. 7,111,700, and a continuation-in-part of application No. 10/634,041, filed on Jul. 31, 2003, now Pat. No. 6,979,011, and a continuation-in-part of application No. 10/633,380, filed on Jul. 31, 2003, now Pat. No. 6,926,297.

(60) Provisional application No. 60/632,709, filed on Dec. 1, 2004.

(51) Int. Cl.
B62K 1/00 (2006.01)

(52) U.S. Cl. .................. 280/276; 280/279; 180/219

(58) Field of Classification Search ............... 180/219, 180/220; 280/274–279, 283–286
See application file for complete search history.

(56) References Cited

U.S. PATENT DOCUMENTS

| | | | | |
|---|---|---|---|---|
| 937,614 A * | 10/1909 | Lampel | .................. | 280/276 |
| 4,756,547 A * | 7/1988 | Trema | .................. | 280/276 |
| 4,766,982 A * | 8/1988 | Hayashi et al. | .......... | 188/181 A |
| 5,156,231 A * | 10/1992 | Trema | .................. | 180/227 |
| 5,209,319 A * | 5/1993 | Buell | .................. | 180/219 |
| 5,441,291 A * | 8/1995 | Girvin, III | .................. | 280/276 |
| 5,494,302 A * | 2/1996 | Farris et al. | .................. | 280/276 |
| 5,692,764 A * | 12/1997 | Klein et al. | .................. | 280/279 |
| 5,749,590 A * | 5/1998 | Roerig | .................. | 280/276 |
| 5,924,714 A * | 7/1999 | Farris et al. | .................. | 280/276 |
| 6,017,047 A * | 1/2000 | Hoose | .................. | 280/276 |
| 6,336,647 B1 * | 1/2002 | Iwai et al. | .................. | 280/276 |
| 6,357,775 B1 * | 3/2002 | Iwai et al. | .................. | 280/276 |
| 6,893,037 B1 * | 5/2005 | Galasso | .................. | 280/276 |

* cited by examiner

Primary Examiner—Lesley D. Morris
Assistant Examiner—L. Lum
(74) Attorney, Agent, or Firm—MotoCzysz LLC; Richard Calderwood

(57) ABSTRACT

A motorcycle whose front end has a coil-over shock disposed within the head tube and telescopic forks which include linear bearings riding between flats on the outer face of the inner fork tubes and flats on the inner face of the outer fork tubes. The linear bearings ride on hardened steel races, enabling the fork tubes to be e.g. aluminum. Using an odd number of linear bearings in each fork prevents having two linear bearings at 180° opposition which would increase sensitivity to manufacturing tolerance stackups, preload, and the like.

3 Claims, 23 Drawing Sheets

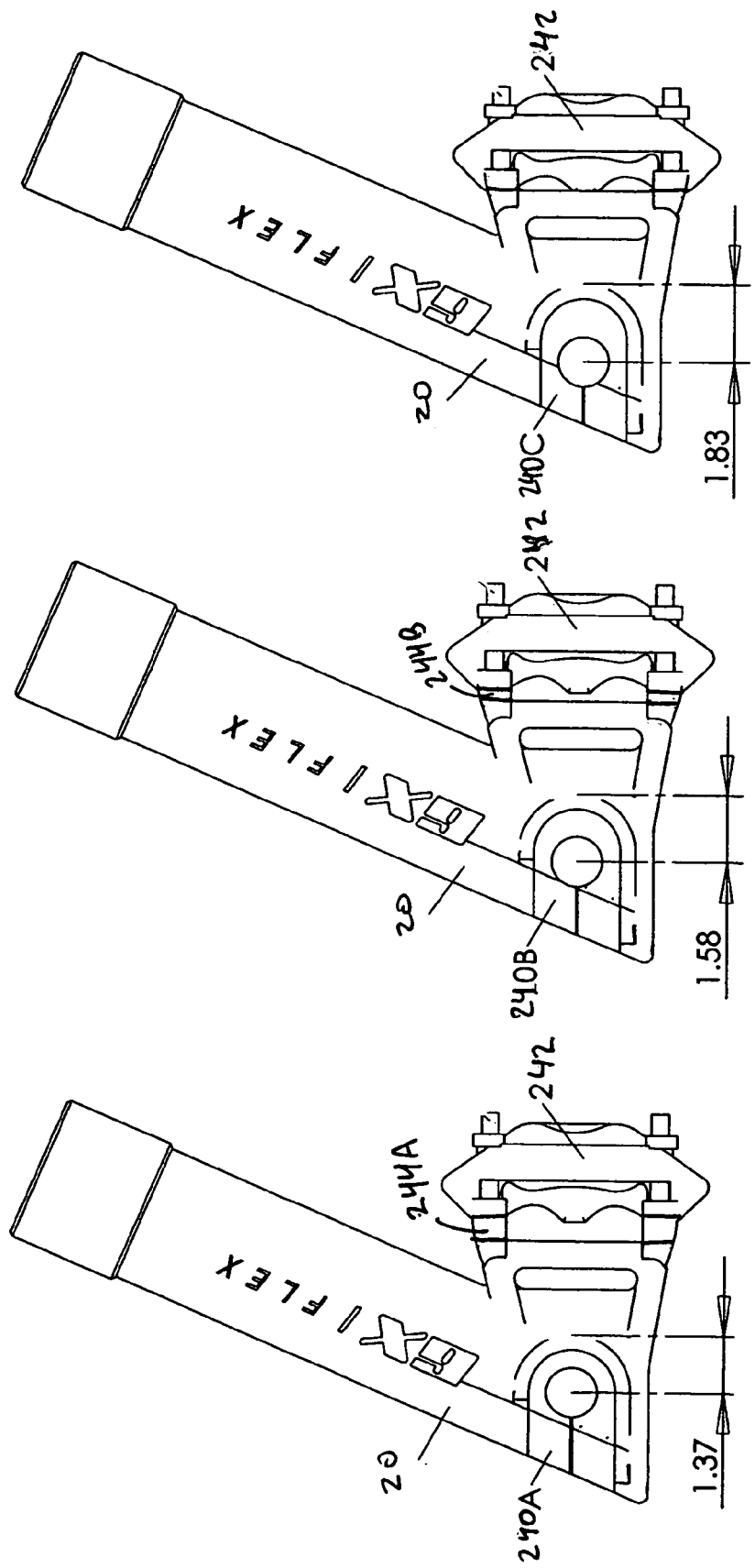

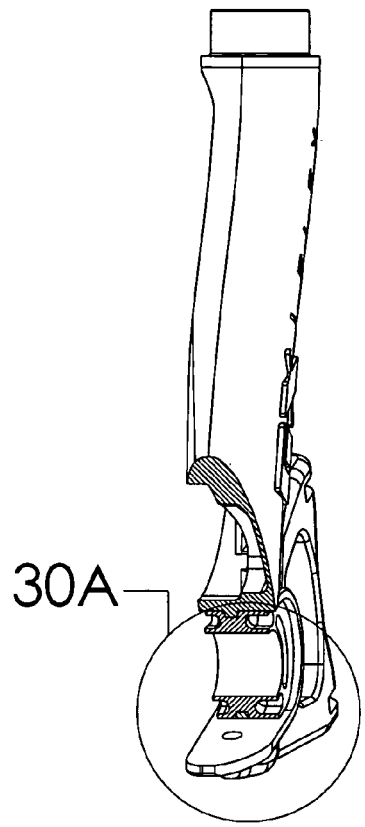
Fig. 30
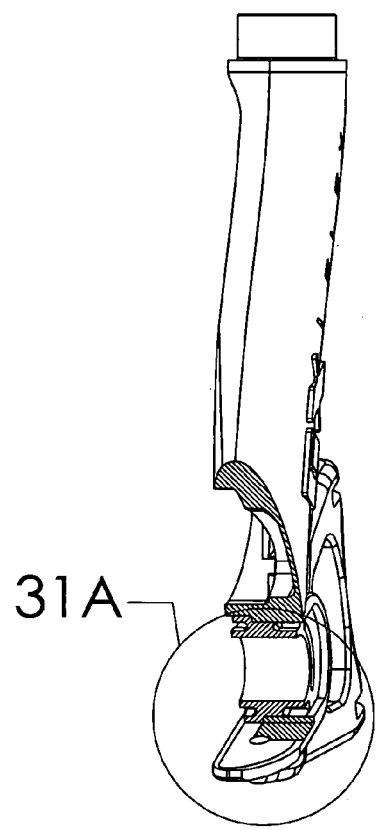
Fig. 31
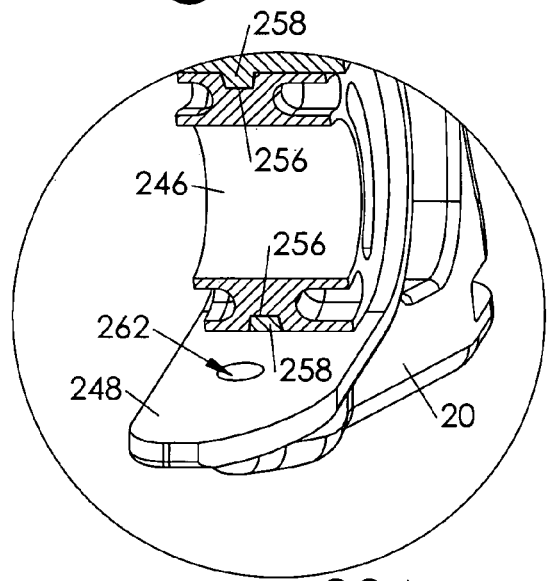
30A
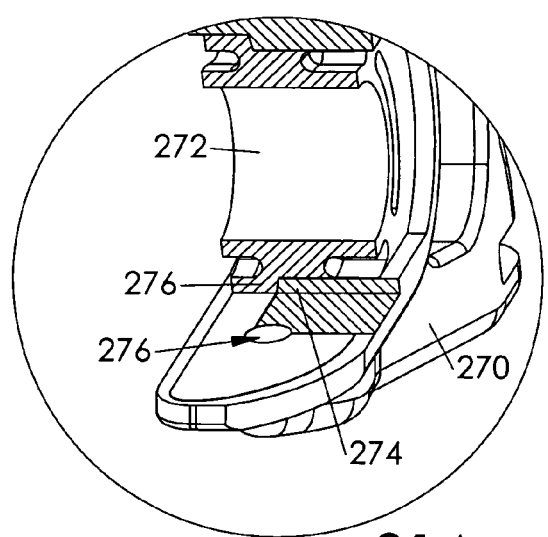
31A

FRONT SUSPENSION FOR MOTORCYCLE

RELATED APPLICATIONS

This application is a continuation in part of application Ser. No. 10/633,381 "Coaxial Steering and Suspension for Motorcycle" now U.S. Pat. No. 7,111,700 and Ser. No. 10/634,041 "Motorcycle Fork Bottom Having Different Longitudinal Stiffness and Adjustable Sideways Stiffness" now U.S. Pat. No. 6,979,011 and Ser. No. 10/633,380 "Front End Trail Adjustment" now U.S. Pat. No. 6,926,297 all filed Jul. 31, 2003 by this inventor, and also claims benefit of a provisional application 60/632,709 "Linear Bearing Forks for Motorcycle" filed Dec. 1, 2004 by this inventor.

BACKGROUND OF THE INVENTION

1. Technical Field of the Invention

This invention relates generally to suspension components for two-wheeled vehicles, and more specifically to front steering and front spring/shock components.

2. Background Art

The vast majority of motorcycles (and full- and front-suspension bicycles) are equipped with front suspensions in which a pair of telescopic forks are coupled to the steering head of the motorcycle's frame by an upper triple clamp and a lower triple clamp. The triple clamps provide enough lateral offset that the forks clear the sides of the front tire. Trail is a measurement, on the ground, from a point projected through the steering axis to the center of the tire's contact patch directly below the axle, and determines the self-centering stability of the steering. The triple clamps are usually constructed to provide some measure of longitudinal offset, as well, to alter the trail. The forks are either of the conventional "right-side-up" or sliding-female configuration, or the "upside-down" or sliding-male configuration. In either case, a cylindrical tube or piston slides axially within a cylindrical cylinder.

In nearly all cases, both the suspension springs and the damping or shock absorbing components are disposed within one or both of the sliding tube assemblies. Unfortunately, because the substantial mass of the springs, dampers, oil, and other related suspension components is located a significant distance—generally in the neighborhood of 2.5 inches—from the axis of the steering head, the front end has an undesirably large moment of rotational inertia. In other words, the front end has a heavy "swing weight" which reduces both the "feel" and the responsiveness of the front end.

Alternative front end configurations have occasionally been seen, but all suffer from this same malady, and their inventors have been attempting to solve other problems, such as front end "dive" under hard braking, rather than reducing the moment of rotational inertia. Examples include the well-known BMW Telelever, the Britten front end, the Hossack front end, the RADD-Yamaha front end, and various hub-center systems such as that found on the Bimota Tesi.

None of these previous geometries places the spring or damper components coaxial to the steering head, and all suffer from having stylistic, aesthetic appearances which are dramatically different than the almost universally preferred conventional dual fork system. Furthermore, all are significantly more complex than the conventional dual fork system. The downside of these previous systems, such as increased mass, outweigh any benefit they may have offered on other fronts.

Some of the more advanced conventional telescopic forks provide external control knobs for adjusting some, but not all, of the hydraulic dampening characteristics of their internal dampening systems. For example, some forks have "clicker" adjusters for altering rebound dampening, compression dampening, and spring preload. There are other, more significant characteristics of conventional forks which are not externally adjustable, such as spring strength, oil quantity, oil viscosity, shim stacks, and so forth. Furthermore, existing telescopic fork front ends offer front ride height adjustment only by way of loosening the triple clamps and raising or lowering the upper fork tubes with respect to the triple clamps. This is a difficult, time consuming, and imprecise operation.

Fork flex, especially under braking, is a significant contributor to the stiction which is known to dramatically reduce the effectiveness and perceived quality of a motorcycle's front suspension.

As a motorcycle rider applies the front brake, the front forks are subjected to significant flexing force and torque in the direction of travel, as the rearward force on the front tire's contact patch presses rearward on the bottom of the forks at the axle, while the inertia of the motorcycle's mass presses forward on the top of the forks at the triple-clamps. Manufacturers battle this flex by using larger-diameter and thus stiffer fork tubes.

Fork flex, especially under braking, is a significant contributor to the stiction which is known to dramatically reduce the effectiveness and perceived quality of a motorcycle's front suspension. The manufacturer may battle this stiction by making even greater increases in the diameter and stiffness of the fork tubes, and by using expensively coated bushings, and so forth.

These engineering changes have an unfortunate side effect, which is exposed by the fact that motorcycles lean to the inside when cornering. In general, the faster a corner is taken, the farther over the motorcycle must lean. While leaned over, the axis of the fork suspension is not perpendicular to the ground, and yet the front tire's contact patch (which is at the center of the tire when riding straight, but is significantly off to the side of the tire when the bike is leaned over) remains parallel to the ground. Then, when the front tire encounters a bump in the road, the bump forces the tire in the vertical direction, perpendicular to the ground. But, because the forks are not oriented in that direction, the effect is that the force of the bump is applied to the forks somewhat laterally (in other words, radially or sideways), rather than axially with respect to the sliding ability of the fork tubes.

The forks' stiffness, which the engineer gave the fork tubes to counteract flex under braking, is now doing exactly the wrong thing with respect to the force of the bump—it is fighting the bump, rather than supplely allowing the front tire to track the road surface and remain in contact with the ground. Riders experience this as one form of front end chatter, especially when traversing an extended section of bumpy or rippled racetrack corner. The result is often a front end push which may end in a crash.

The motorcycle front suspension includes telescopic forks. Traditionally, bushings have been used to reduce friction between the inner fork tube and the outer fork tube. The upper end of the lower tube has a bushing, and the lower end of the upper tube has a bushing. Under non-axial loads, such as when braking, the mating surface of the lower fork tube is levered against the mating surface of the outer fork tube, significantly increasing the friction between the tubes. The shorter the distance of overlap—that is, the less the inner tube extends into the outer tube—the more pronounced this effect becomes, because the lever arm distance between the upper and lower bushings is reduced. And the greater the distance between the lowermost point of overlap and the ground (where the force is being applied), the greater this effect will be, because the longer the effective lever arm is.

Bearings provide lower friction than bushings. If the bushings were replaced with e.g. sets of ball bearings, the friction would be significantly reduced. However, the ball bearings concentrate the leverage force onto very small areas of the fork tubes, and can cause significant scoring and gouging of the fork tubes, especially if the fork tubes are made of a material which is not quite hard.

While a ball bearing concentrates its load at essentially a single point, a needle bearing spreads its load over a tremendously increased area, in essence a line the length of the bearing. However, while roller bearings offer the advantage of being able to travel in any direction, needle bearings are limited to traveling back and forth in a single direction.

Fork tubes are traditionally cylindrical, for a variety of advantageous reasons. Cylinders are relatively easy to machine to consistent and even tolerances. Two cylinders can be mated without any particular clocking (angular) requirements.

Trail is the distance, on the ground, from a point projected through the front axle on a line parallel with the steering axis, to a point directly below the front axle, or in other words, to the center of the contact patch. Trail directly impacts the steering stability of the motorcycle and its "return-to-center" force. Trail is affected by rake, which is the angle between vertical and the steering axis; steeper rake reduces trail. Trail is also affected by longitudinal fork offset, or the distance which the fork tubes are set in front of the frame's head tube; more offset decreases trail. Trail is also affected by axle offset; if the axle is coupled to the forks in front of their center, it increases trail.

The rider may wish to increase or decrease trail to, for example, change the steering feel or feedback, to improve steering quickness, or to eliminate a high-speed wobble, or to reduce a front end "push". Often, riders will talk as though they are fixing these things by adjusting the ride height, which is generally discussed in terms of how far the forks extend up through the top triple clamp. However, decreasing front ride height by raising the forks farther through the triple clamps in reality steepens the rake (brings the forks closer to vertical), which, in turn, decreases trail (within the normal adjustment range). It is ultimately the change in trail which causes the effects which the rider attributes to his ride height adjustment.

Although adjusting trail can have very beneficial results, the other changes which go along with it in a conventional motorcycle may often—or even usually—outweigh or significantly counteract the benefits of the trail adjustment. For example, lowering ride height obviously puts the frame, engine cases, fairings, and other parts into closer proximity to the racetrack, often to an extent that cornering ability is actually reduced because hard parts of the motorcycle ground out on curbings or even the asphalt itself; it also changes the weight transfer bias under braking.

What is needed, then, is a system which has the aesthetic appeal and simplicity of the dual fork geometry, with a significantly reduced moment of rotational inertia. What is further needed is a system which offers reduced stiction.

What is also needed, then is an improved front fork which has suitably low lateral stiffness to better enable the front tire to track ground irregularities while leaned over cornering, without compromising its excellent longitudinal stiffness to resist flexing under hard braking. What is further desirable is such a fork which has adjustable lateral stiffness.

What is further needed is a mechanism which facilitates trail adjustments without adversely affecting other geometry of the motorcycle such as ride height and rake angle.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIGS. 26–28 show the fork bottom equipped with different trail adjustment blocks.

FIG. 30 is a partially cross-sectioned view of one embodiment of a fork lower, showing its mating with a trail adjustment block, including a detail view.

FIG. 31 is a partially cross-sectioned view of another embodiment of a fork lower, showing its mating with another trail adjustment block, including a detail view.

DETAILED DESCRIPTION

Coaxial Steering and Suspension Components

Figure 1:
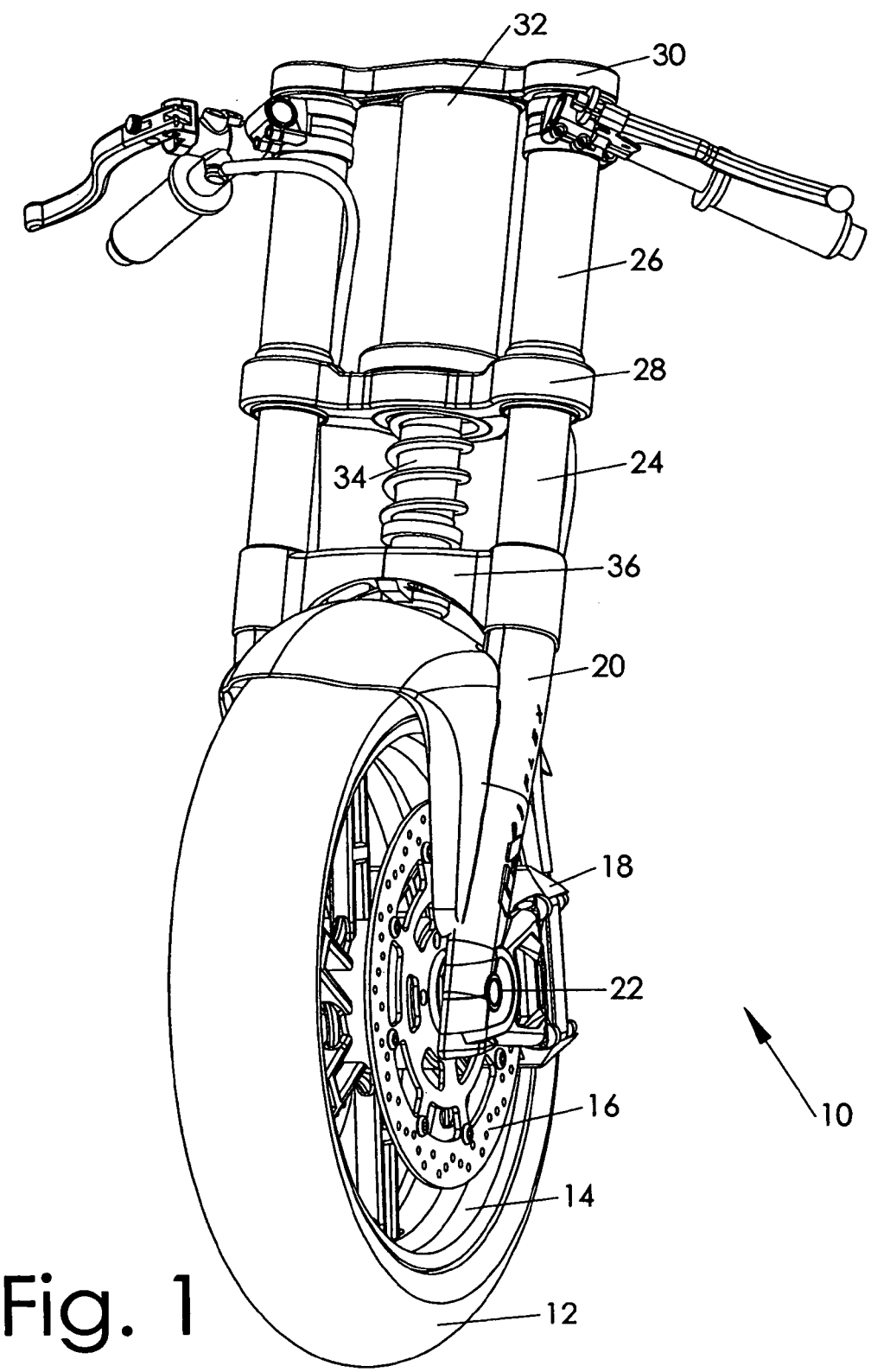
FIGS. 1–4 show various views of one embodiment of the front end and steering/suspension system of the present invention.
Figure 2:
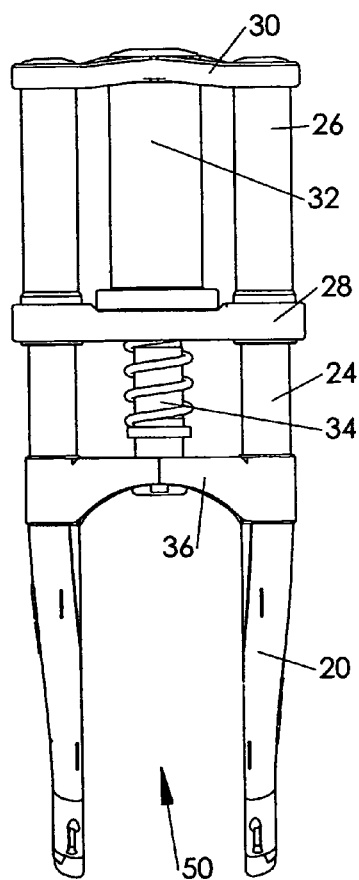
Figure 3:
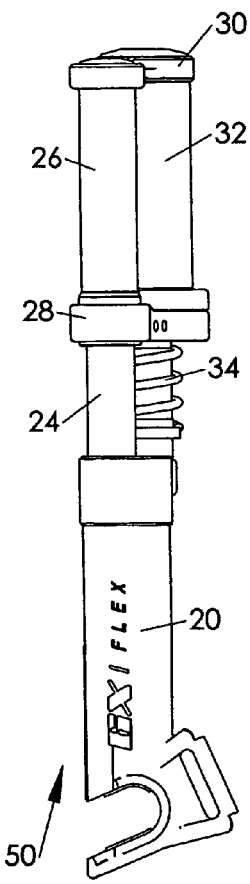
Figure 4:
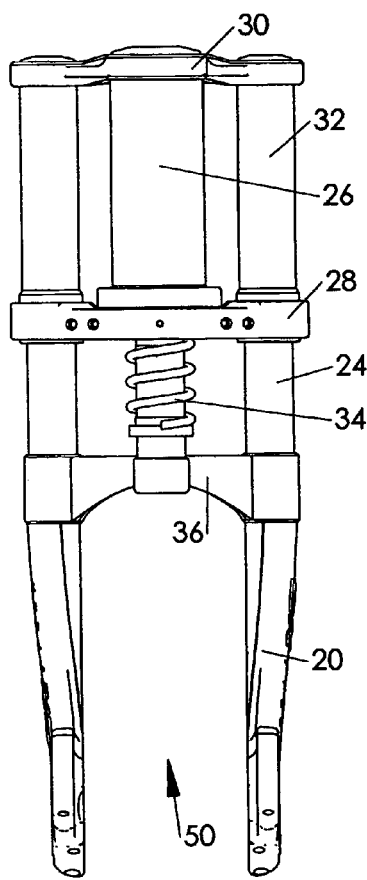

FIGS. 1–4 illustrates one embodiment of a motorcycle front end 10 and specifically the steering/suspension system 50, viewed generally from the front in FIGS. 1 and 2, the left side in FIG. 3, and the rear in FIG. 4. The front end includes a tire 12 mounted on a wheel 14 and equipped with brake rotors 16 and brake calipers 18. A fork bottom 20 includes a fork bottom body coupled to the axle 22 and to a pair of male lower fork tubes 24 which slide in a pair of female upper fork tubes 26. In other embodiments, conventional fork tubes are used, without fork bottoms. A lower triple clamp 28 and an upper triple clamp 30 are coupled to the upper fork tubes and couple them to a steering stem assembly (not visible) which rotates within a head tube 32 which is part of, or coupled to, the frame (not shown) of the motorcycle.

The front end 10 thus pivots or rotates about a steering axis which is coaxial with the head tube 32. This invention differs from the prior art in that at least one of the spring (suspension) and/or shock (damping) components is coaxially disposed within the head tube. In one embodiment, a single coil-over shock 34 provides both spring support and damping for the front end, while in other embodiments, a more conventional cartridge system (not shown) could be employed within the fork tubes. The bottom end of the coil-over shock is coupled to a fork buttress 36. The fork buttress may be coupled to the lower fork tubes or to the fork bottoms. In one embodiment, the fork buttress comprises two halves, each of which is integrally formed with a respective fork bottom, as shown.

Figure 5:
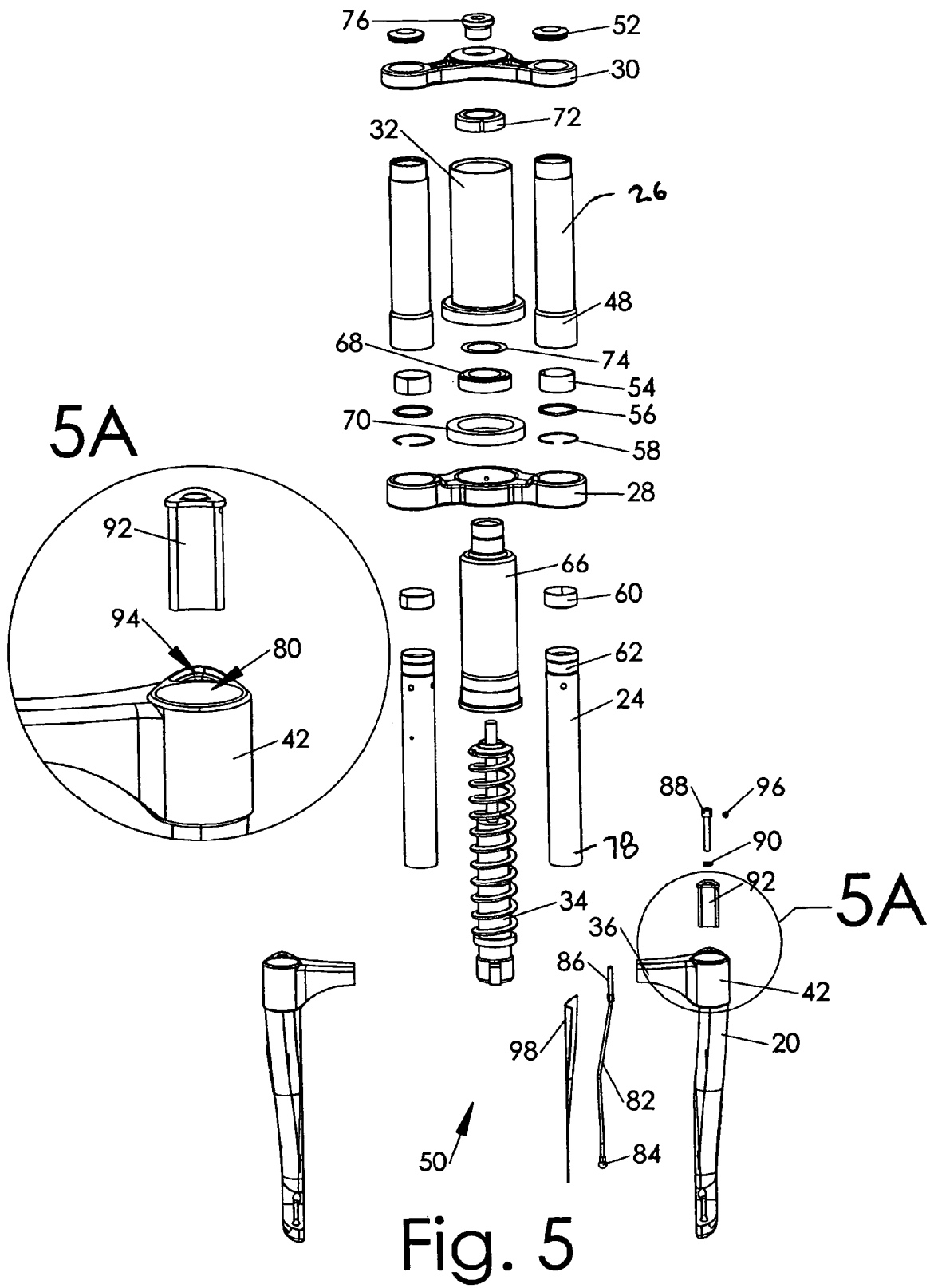
FIG. 5 shows an exploded view of the steering/suspension system.

FIG. 5 illustrates the steering/suspension system 50 of the motorcycle front end, viewed generally from the front and shown in an exploded view. For ease of illustration, only a single fork will be described. The upper fork tube 26 threads or, preferably, clamps into the upper triple clamp 30. A fork cap 52 seals the open end of the fork tube to prevent contamination of the sliding components, but is not necessarily an airtight seal. A stationary fork bushing 54 and a seal 56 fit within the lower end 48 of the upper fork tube, and are held in place by a snap wire 58. A sliding fork bushing 60 mates with the upper end 62 of the lower fork tube 24. The stationary and sliding fork bushings provide a low-stiction but tight-tolerance sliding fit of the lower fork tube within the upper fork tube. In practice, the components may need to be assembled in a slightly different manner than suggested by this exploded view, as the bushings are not generally able to slide past each other, and their interference is part of what keeps the telescopic forks from telescoping completely to disassembly.

A steering tube 66 rotates within the head tube 32 on an upper bearing 68 and a lower bearing 70. A jam nut 72 and washer 74 secure the upper bearing onto the steering tube. A top bolt 76 threads into the steering tube and secures it to the upper triple clamp.

The lower end 78 of the lower fork tube threads or otherwise couples to a hole 80 in the upper end 42 of the fork bottom 20. The upper end of the coil-over shock 34 fits up into and engages the steering tube, while the lower end of the monoshock engages the fork buttress 36 at the upper end 42 of the fork bottom.

The lateral stiffness of the fork bottom is controlled by a tension cable or rod 82. In some embodiments, the tension rod may apply tension or pull. The lower end 84 of the tension cable engages the fork bottom, while the upper end 86 of the tension cable is engaged and tensioned by a tension adjuster 88. The tension adjuster and a washer 90 engage a tension adjuster block 92 which fits into a hole 94 in the upper end of the fork bottom. A detent ball 96 retains the tension adjuster within the tension adjuster block and, in some embodiments, provides "clicker" adjustment feedback as is commonly present in other motorcycle suspension adjustments such as compression and rebound damping. For aesthetics and aerodynamics, a fork bottom inner cover 98 may be coupled to the inward-facing portion of the fork bottom, covering the tension cable and other components.

Figure 6:
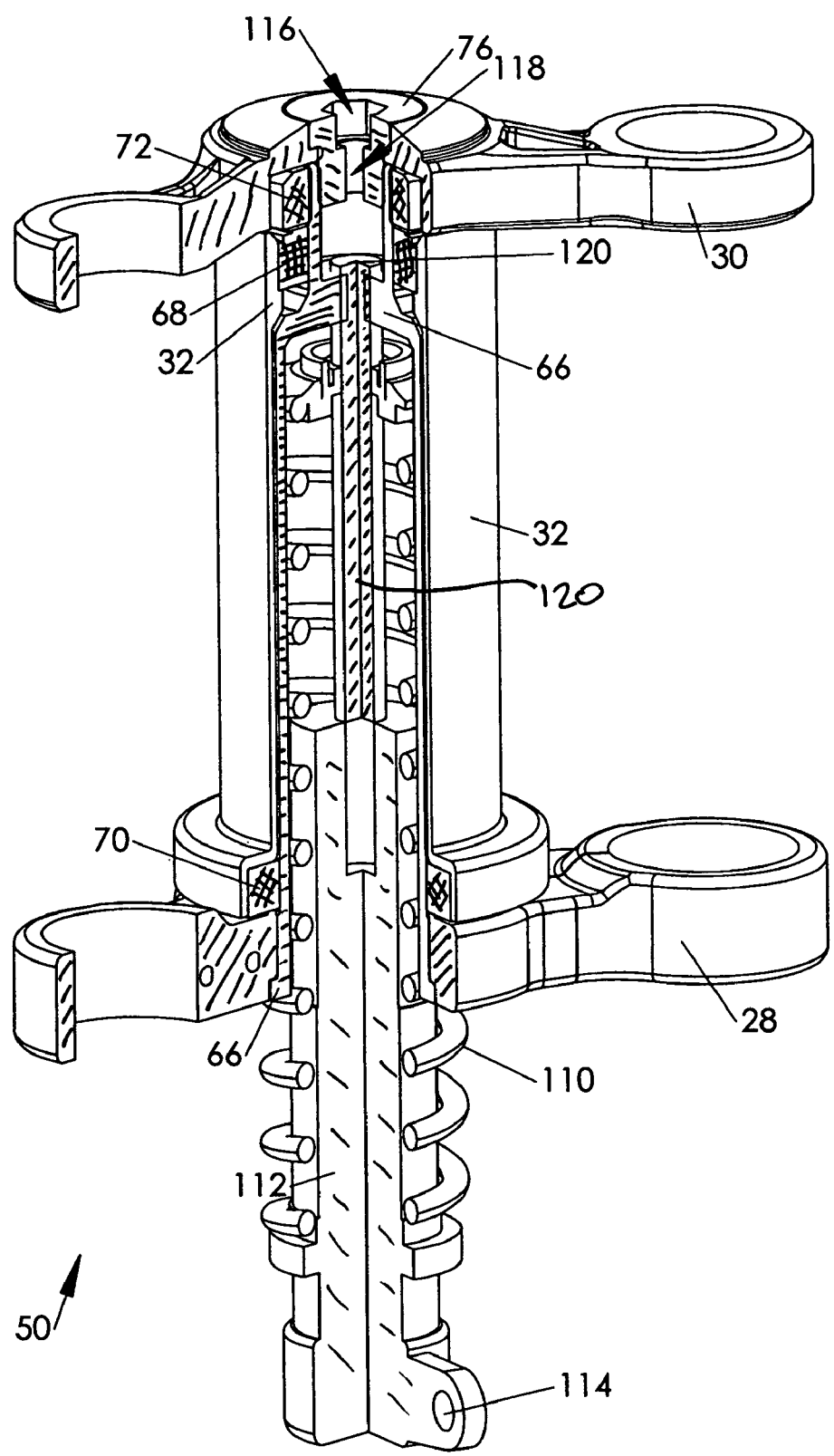
FIG. 6 shows a perspective, cutaway view of a portion of the steering/suspension system.

FIG. 6 illustrates further details of one embodiment of the steering/suspension system 50, with a cutaway for visibility into the coaxial alignment of the suspension components within the head tube 32. The suspension components are illustrated somewhat generically and in a much simplified configuration omitting many details which are not essential to understanding this invention but which are well within the abilities of those of ordinary skill in the art. The suspension components may include one or more load-bearing components such as a coil spring 110, and one or more damping components 112. As such, the suspension components may be quite similar to a conventional rear shock such as is conventionally used in modern sportbikes, with the addition of a suitable mounting mechanism 114 adapted for coupling or mating with the fork brace (not shown) or other lower mounting component.

The suspension components are disposed coaxially with the head tube 32, or, more precisely, coaxially with the steering axis. The steering tube 66 is disposed coaxially within the head tube, and rides on an upper bearing 68 and a lower bearing 70. The jam nut 72 is threaded onto the steering tube. The top bolt 76 threads into the steering tube and coaxially locates the upper triple clamp 30 with respect to the steering axis. The top bolt is provided with, in one embodiment, an internal hex socket 116 by which the top nut is tightened.

In one embodiment, the top nut is further provided with a passage 118 and the steering tube is provided with a passage, through which a tool (not shown) can be inserted to adjust various settings of the suspension components, such as compression damping, rebound damping, preload, ride height, and so forth. Again, for ease of illustration, these various adjustment mechanisms are not shown on the coil-over shock.

One noteworthy feature of this system is that the ride height of the front end can be adjusted by screwing threaded rod 120 up and down in the steering tube, and this is completely independent of the coupling of the forks to the triple clamps. This represents a marked improvement over the conventional fork systems, in which the rider must loosen the upper and lower triple clamps, slide or pound the upper fork tubes up and down in the triple clamps until a desired amount of protrusion is achieved, then retighten the triple clamps, while hoping that the fork tubes have not shifted and that the two fork tubes are set at exactly the same height. The coaxial monoshock adjustment of this invention enables the rider to adjust the ride height without fiddling with the triple clamps or fork tubes, and it guarantees a single, consistent setting without the possibility of maladjustment between the two forks. The same monoshock principle applies to other adjustments, as well, such as compression damping, rebound damping, and so forth.

Figure 7:
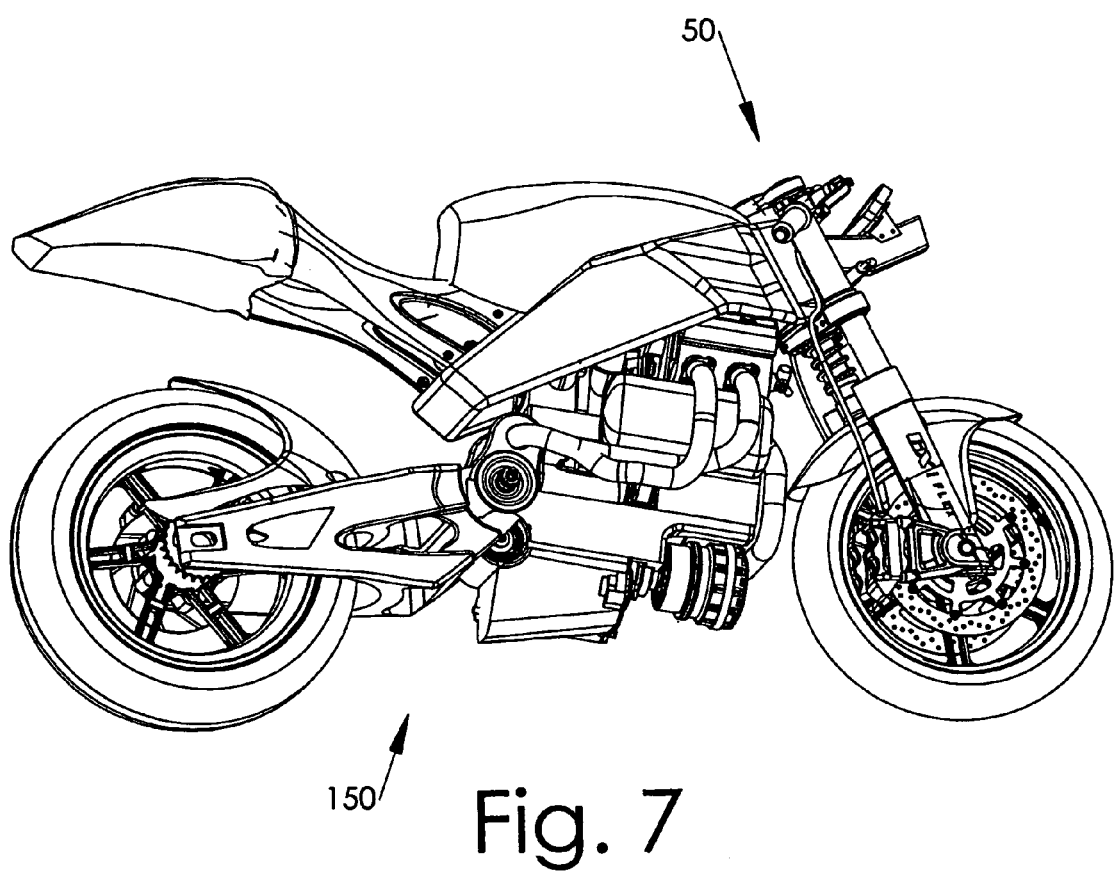
FIG. 7 shows a motorcycle having the coaxial steering and suspension front end of this invention.

FIG. 7 illustrates a motorcycle 150 having a front end 50 with the coaxial steering/suspension system of this invention.

Forks Having Flexible Fork Bottoms

FIG. 1 illustrates a fork bottom 20 including a fork bottom body coupled to the axle 22 and to the lower fork tubes 24. The longitudinal (in the direction of travel) stiffness of the fork bottom is different than the lateral (side-to-side) stiffness of the fork bottom. In one embodiment, the longitudinal stiffness is greater than the lateral stiffness. In some embodiments, the lateral stiffness of the fork bottom is adjustable, as explained below.

Figure 8:
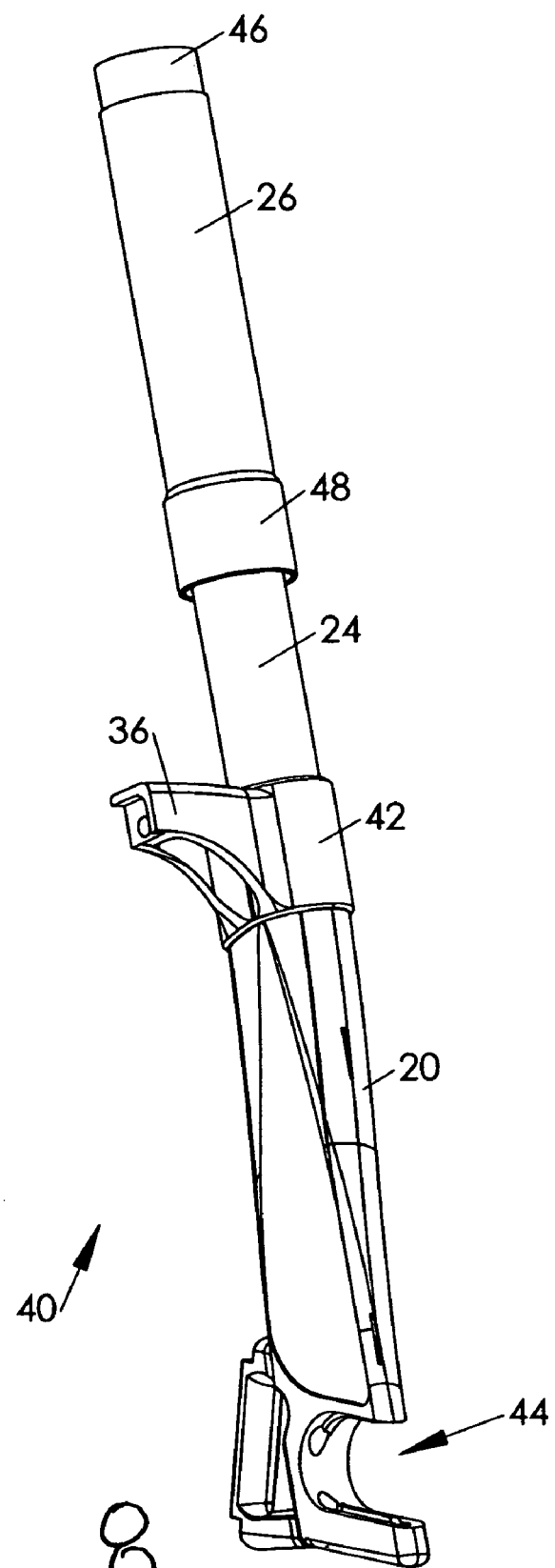
FIG. 8 shows one embodiment of a fork according to this invention.

FIG. 8 illustrates one embodiment of a fork 40 according to this invention. The fork includes an upper fork tube 26, a lower fork tube 24, and a fork bottom 20. The fork bottom includes a sturdy upper end 42 adapted for receiving and retaining the lower fork tube by any suitable means such as pinch bolts (not shown), threads (not shown), or the like. In one embodiment, the fork's half buttress 36 is integrally formed with the sturdy upper end of the fork bottom. The fork bottom further includes a lower end 44 adapted for receiving and retaining the axle assembly (not shown) and the brake caliper (not shown) by any suitable means. The upper fork tube includes an upper end 46 adapted for being secured to the upper triple clamp (not shown) by any suitable means, such as threads (not shown) or pinch bolts (not shown). The upper fork tube includes a lower end 48 adapted for providing a good sliding fit with the lower fork tube.

In some embodiments, especially those in which both the spring and shock components are located coaxially within the head tube, the forks can be much simplified versus the prior art. For example, the telescoping fork tubes do not need to be made to have a fluid-tight seal, as there is no need for them to retain the oil which would be used in a damping system. In fact, in some embodiments, it will be found desirable to ventilate the upper fork tube, the lower fork tube, and/or the fork bottom, to eliminate any pressurization caused by the pumping action of the forks as they extend and compress.

Figure 9:
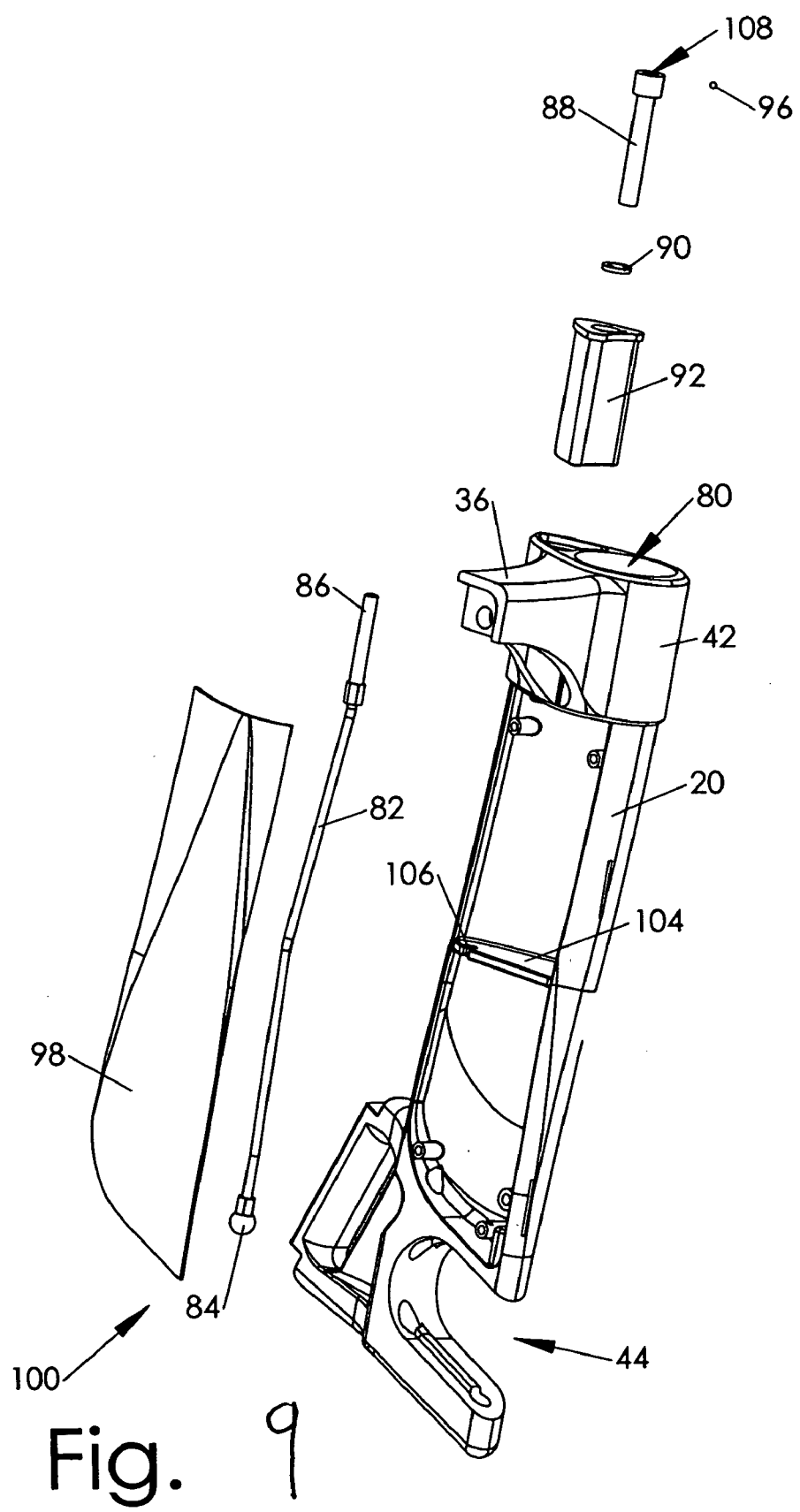
FIG. 9 shows a more detailed exploded view of some of the components of one embodiment of a fork bottom according to this invention.

FIG. 9 illustrates further details of one embodiment of the adjustable flex fork bottom assembly 100. The left fork bottom 20 is shown, as viewed from the front and right, or generally where the front of the tire would be. The side wall 102 of the fork bottom provides stiffness in the longitudinal direction, the direction of travel and braking, while the fact that the fork bottom is not a complete cylinder gives it a measure of lateral flex, from side to side.

A gusset 104 near the middle of the fork bottom provides a fulcrum over which the tension cable 82 is stretched, and may be provided with one or more grooves 106 or bearings or other means for holding the tension cable in a desired position. The lower end 84 of the tension cable is provided with a ball or other means for coupling to the lower end of the fork bottom. The upper end of the tension cable is provided with a threaded rod 86 which engages threads on the tension adjuster 88. The tension adjuster may be provided with a hexagonal socket 108 by which a mechanic can set the flex by tightening or loosening the tension cable, and thus the lateral pressure on the fulcrum 104, thereby changing the amount of lateral flex of the fork bottom. In other embodiments, other adjustment mechanisms may be employed, such as a cammed lever.

As the tension on the tension cable is increased, the fork bottom is placed under increased lateral tension as the tension cable presses down harder and harder on the fulcrum. This tends to make the fork bottom less flexible in the side-to-side dimension, while having little effect on its stiffness in the longitudinal direction. Thus, the invention enables the rider to set up his front suspension to be more or less compliant in lateral flex, to tune the suspension for the mid-corner bumpiness or smoothness of a particular road or racetrack, without compromising longitudinal stiffness which provides good control under heavy braking and which helps eliminate stiction in the telescopic fork tubes. In some cases, the rider may even choose to adjust one fork's sideways flex differently than the other's.

The skilled suspension engineer will be able to select materials, thicknesses, and geometries to provide the desired longitudinal and lateral stiffnesses for his application at hand. For example, in one embodiment, the entire fork bottom is constructed as a monolithic metal structure, such as of cast aluminum. In another embodiment, the central portion of the fork bottom may be fashioned of carbon fiber, while the upper and lower ends may be fashioned of titanium.

Figure 10:
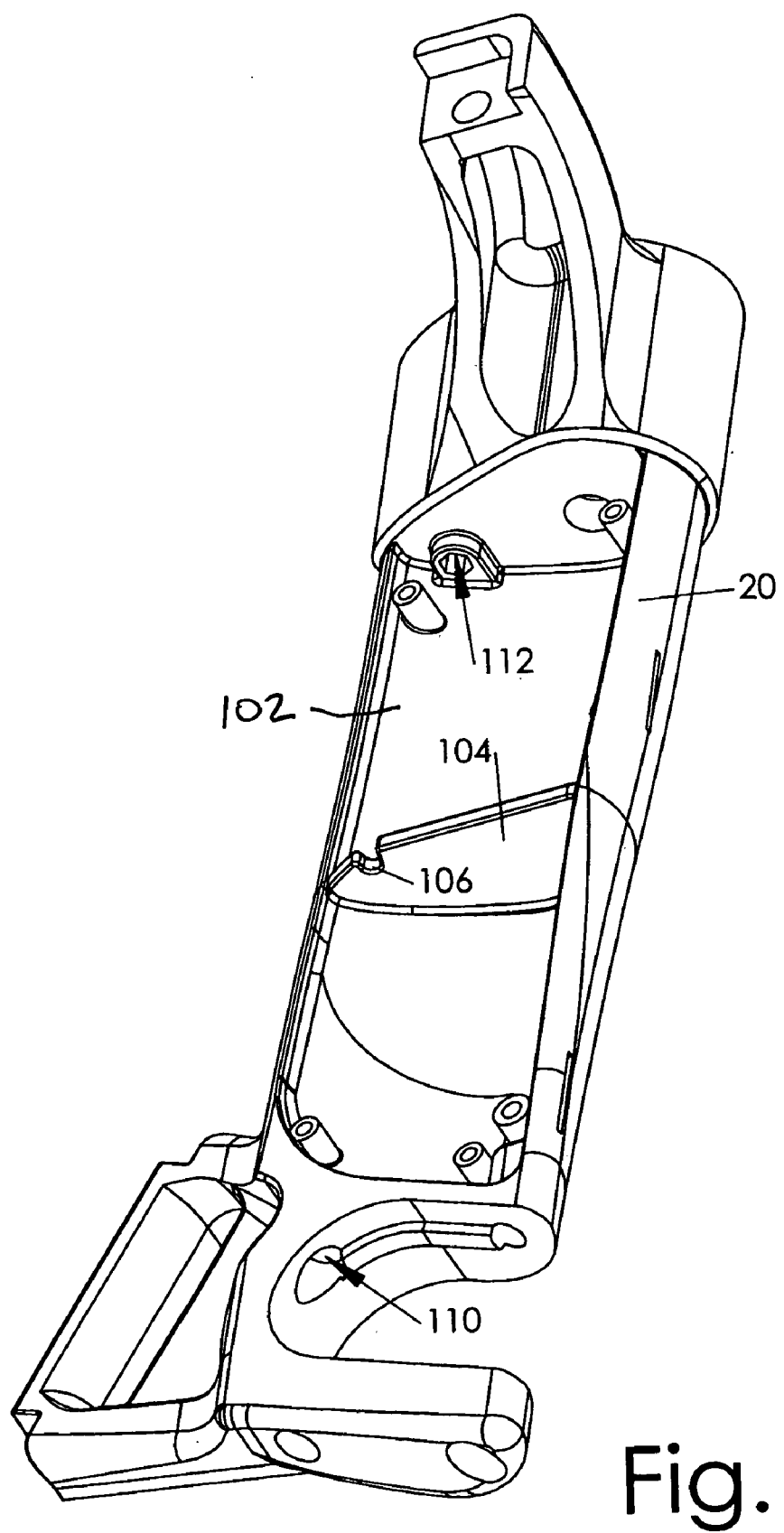
FIG. 10 shows a different angle view of the fork bottom, particularly pointing out the attachment points for the flex control mechanism.

FIG. 10 illustrates the left fork bottom 20 in further detail, viewed from the front and below, to better demonstrate the mounting of the tension cable (not shown). The upper end of the tension cable is fed through a hole 110 in the lower end of the fork bottom and pulled through until the ball (at the lower end 84 of the cable) engages the hole 110. The cable is routed through the groove 106 on the fulcrum 104 and through a hole 112 in the upper end of the fork bottom, then the tension adjuster (not shown) is engaged with the tension cable to place it under tension and retain it.

In other embodiments, alternative mechanisms could be used instead of the tension cable. For example, a pair of threaded rods could each engage the fulcrum and a respective end of the fork bottom, and the rods could be used to place the fork bottom under tension or even under elongating pressure, and the rods could operate independently in some modes. Or, the tension adjustment could be made at the fulcrum, rather than at the end of the tension cable, such as via a jack screw. In another embodiment, the adjustable tension cable could be replaced by a set of alternative vertical inserts placed inside the fork bottom to provide various amounts of end-to-end pressure or tension. Such inserts would advantageously be placed generally perpendicular to the side wall and fulcrum shown in these drawings.

Figure 11:
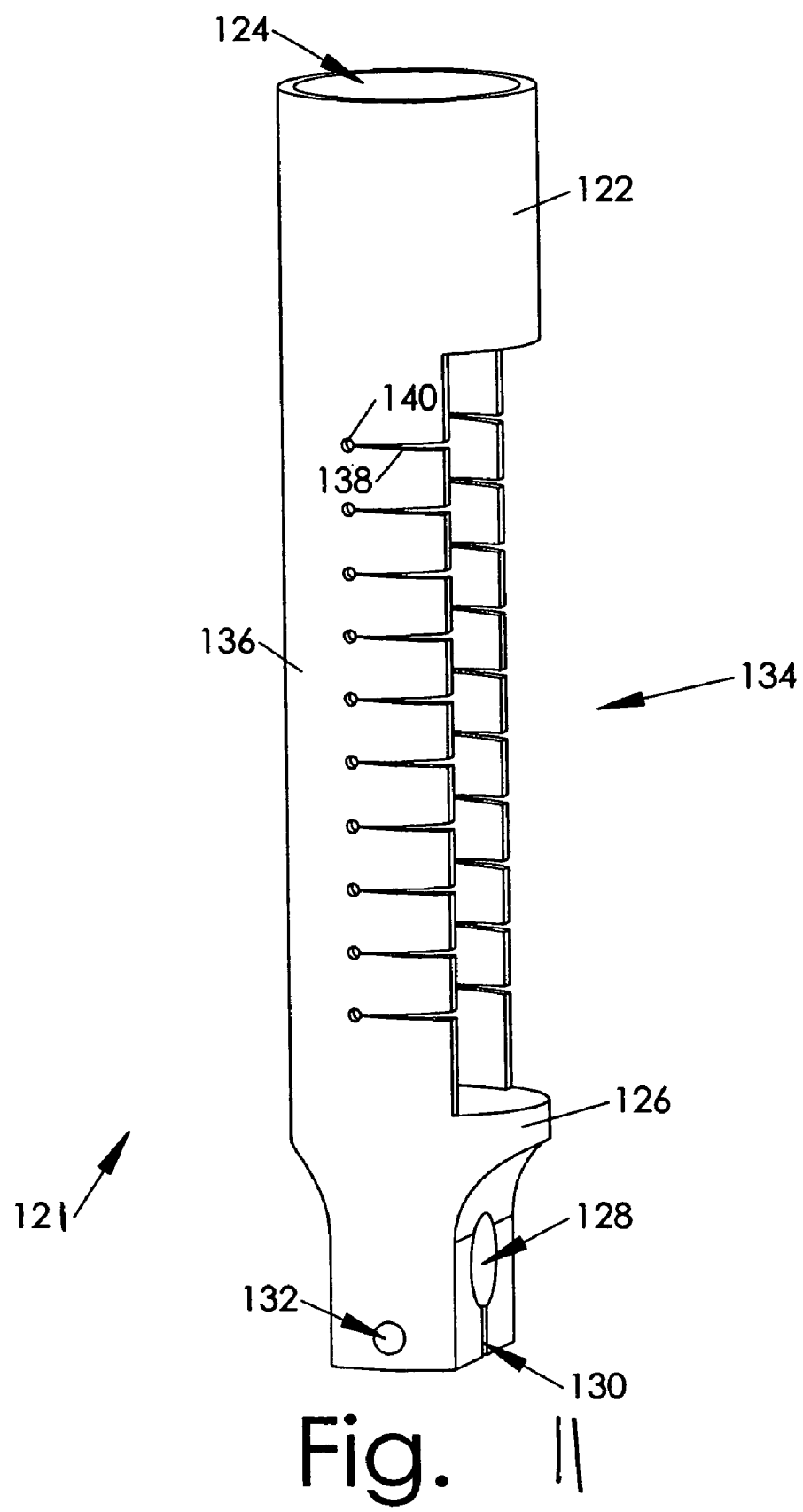
FIG. 11 shows another embodiment of a fork bottom which has different lateral and longitudinal stiffness.

FIG. 11 illustrates another embodiment of a fork bottom 121 which has a different stiffness in the longitudinal direction than in the lateral direction. Shown is a right fork bottom, seen from the front and left. The fork bottom includes an upper end 122 adapted with a hole 124 for receiving the lower fork tube (not shown), and a lower end 126 adapted with a hole 128 for receiving the axle (not shown). A slot 130 and a pinch bolt hole 132 are provided for retaining the axle by a pinch bolt (not shown). The middle portion 134 of the fork bottom includes a side wall 136 which provides good longitudinal stiffness. A series of slits 138 soften the central portion of the fork bottom, giving it more flexibility in the lateral direction. The slits may be provided with holes 140 at their terminal ends, to prevent the slits from tearing or spreading further through the material of the fork bottom. As the fork bottom flexes toward the side such that the slits compress, at the point at which the sides of the slits meet, the fork bottom will become more rigid. In some embodiments, the slits may be made of different dimensions (e.g. vertical height in the orientation shown), such that they do not all pinch closed at the same amount of lateral flex, for a more "progressive" and less abrupt increase in the lateral stiffness of the fork bottom.

FIG. 7 illustrates a motorcycle 150 adapted with the front end having the forks of the present invention, including upper fork tubes and lower fork tubes, and including fork bottoms having different longitudinal stiffness and lateral stiffness, and having adjustable lateral stiffness.

Telescopic Fork Tubes Having Linear Bearing

Figure 12:
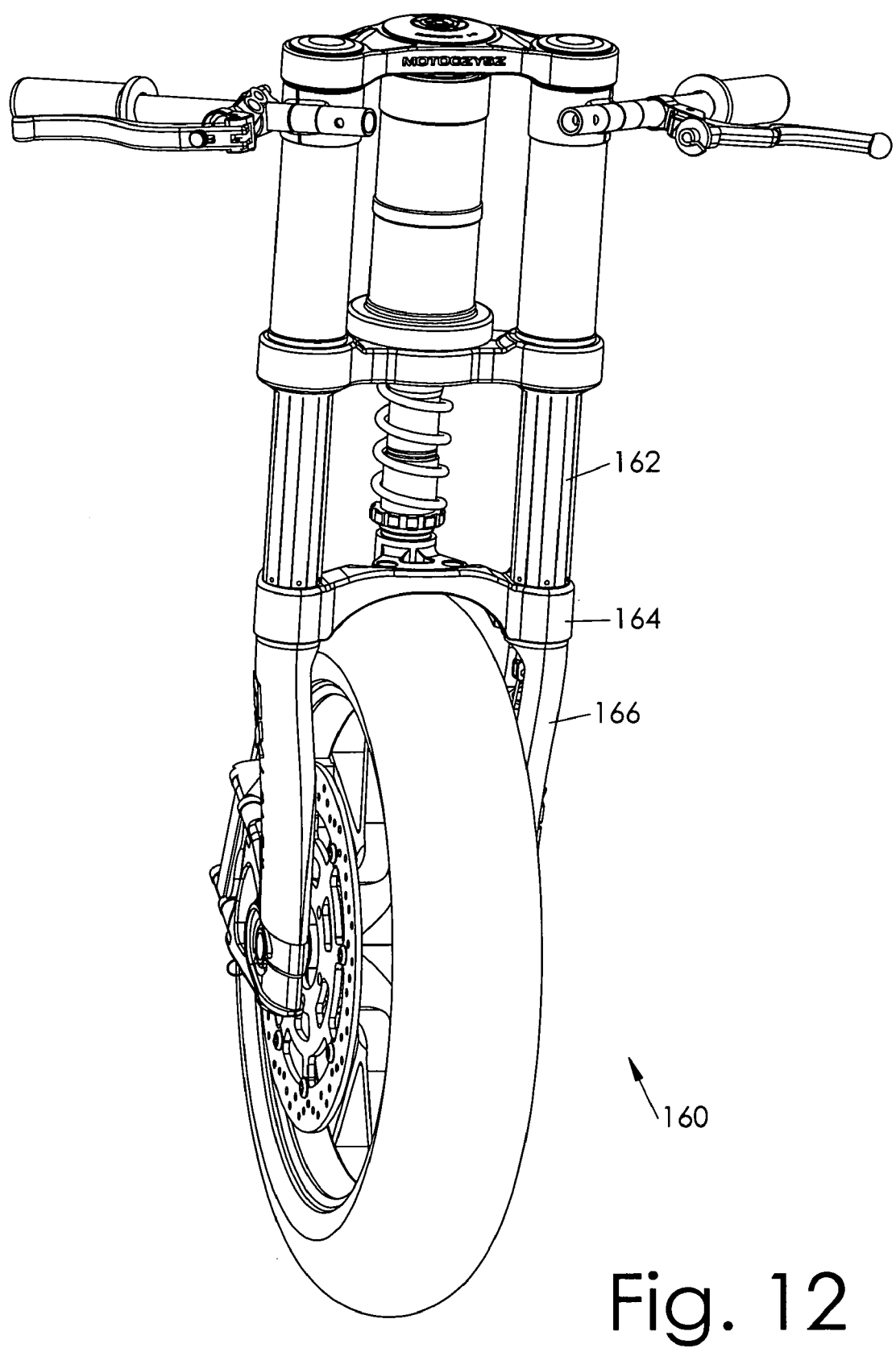
FIG. 12 shows a motorcycle front end equipped with linear bearings, according to another embodiment of this invention.

FIG. 12 illustrates a motorcycle front end 160 similar to that of FIG. 1, which has been further improved to further reduce stiction. The telescopic forks 162 ride on linear bearings (not shown) rather than on bushings. A single-piece fork bridge 164 or buttress couples the lower ends of the forks together and to their respective fork bottoms 166.

Figure 13:
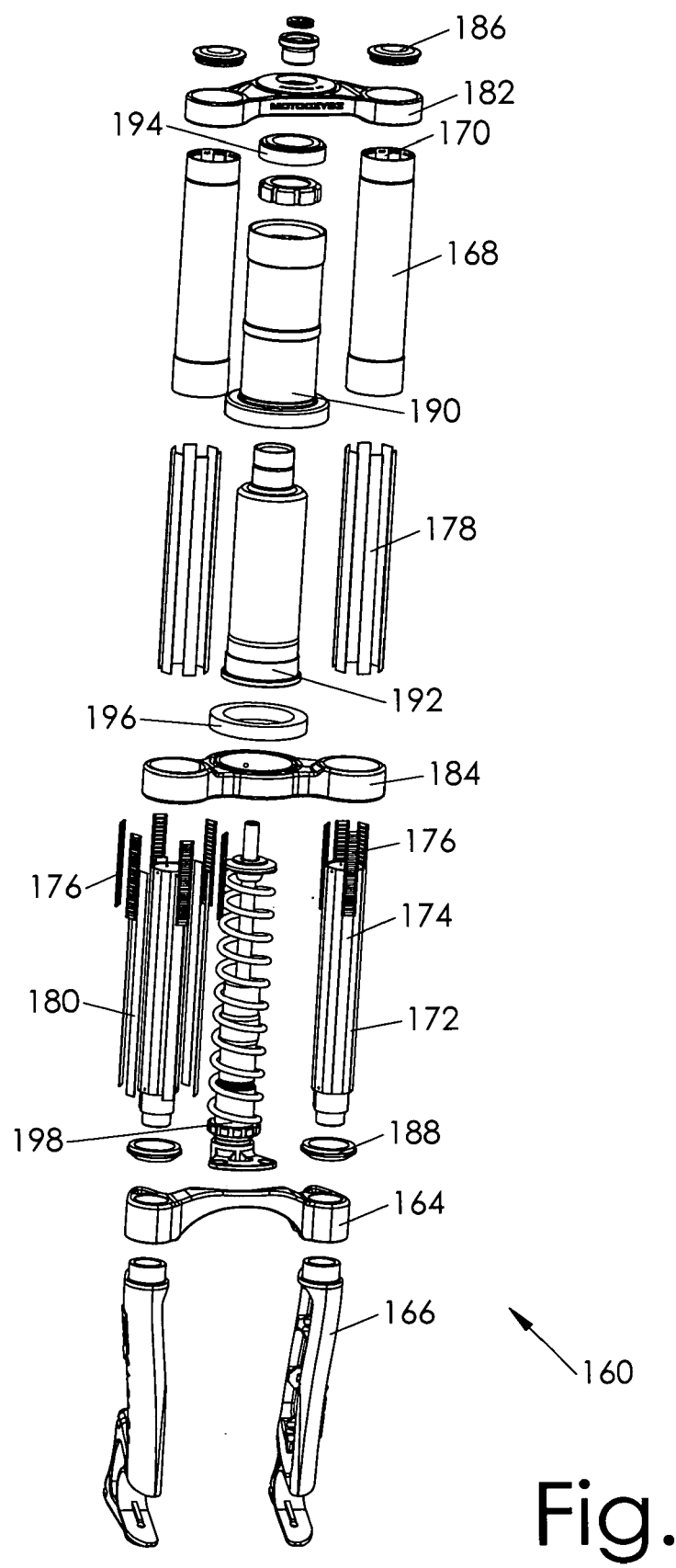
FIG. 13 shows an exploded view of a portion of the front end of FIG. 12.

FIG. 13 illustrates an exploded view of various components of the motorcycle front end 160. The right fork (shown on the left in this front view) is shown in a slightly more exploded state than the left fork. Outer fork tubes 168 have "flats" 170 extending axially along their inner surfaces, and inner fork tubes 172 have flats 174 extending axially along their outer surfaces. Sets of linear bearings 176 are disposed between corresponding flats of the inner and outer fork tubes. In one embodiment, hardened outer bearing races 178 are disposed within or upon the flats of the outer fork tubes and hardened inner bearing races 180 are disposed within or upon the flats of the inner fork tubes, and the linear bearings contact the races rather than the fork tubes themselves. This permits the fork tubes to be made of light weight materials such as aluminum, which might be damaged if the bearings—which are typically made of harder materials such as steel—were to directly contact the fork tubes.

In one embodiment, each linear bearing includes a plurality of needle bearings held in a strip-shaped cage. In other embodiments, other bearing configurations may be employed, such as ball bearings. Needle bearings are, however, preferred, because they spread the bearing loads over a larger surface area than e.g. ball bearings.

An upper triple clamp 182 and a lower triple clamp 184 are coupled to the upper fork tubes. In one embodiment, the upper fork tubes are clocked (or, in other words, rotationally oriented) to one or both of the triple clamps, to provide symmetrical bearing loading between the left fork and the right fork, as well as to provide a clean, symmetrical cosmetic appearance. Fork caps 186 secure the upper fork tubes to the upper triple clamp, such as by threading into the upper fork tubes and pinching onto the upper triple clamp. Optionally, dust seals 188 are fitted to the lower ends of the upper fork tubes, to reduce the amount of dust, grit, and other contaminants which enter the fork tubes, to extend the life of the linear bearings and to maintain a smooth, notchless telescopic feel.

A head tube 190 is coupled to the frame (not shown). A steering tube 192 is disposed within the head tube and rides on an upper bearing 194 and a lower bearing 196. A coil-over shock 198 is disposed within the steering tube. The shock's upper end is coupled to the steering tube or to the upper triple clamp, and the shock's lower end is coupled to the fork bridge.

Figure 14:
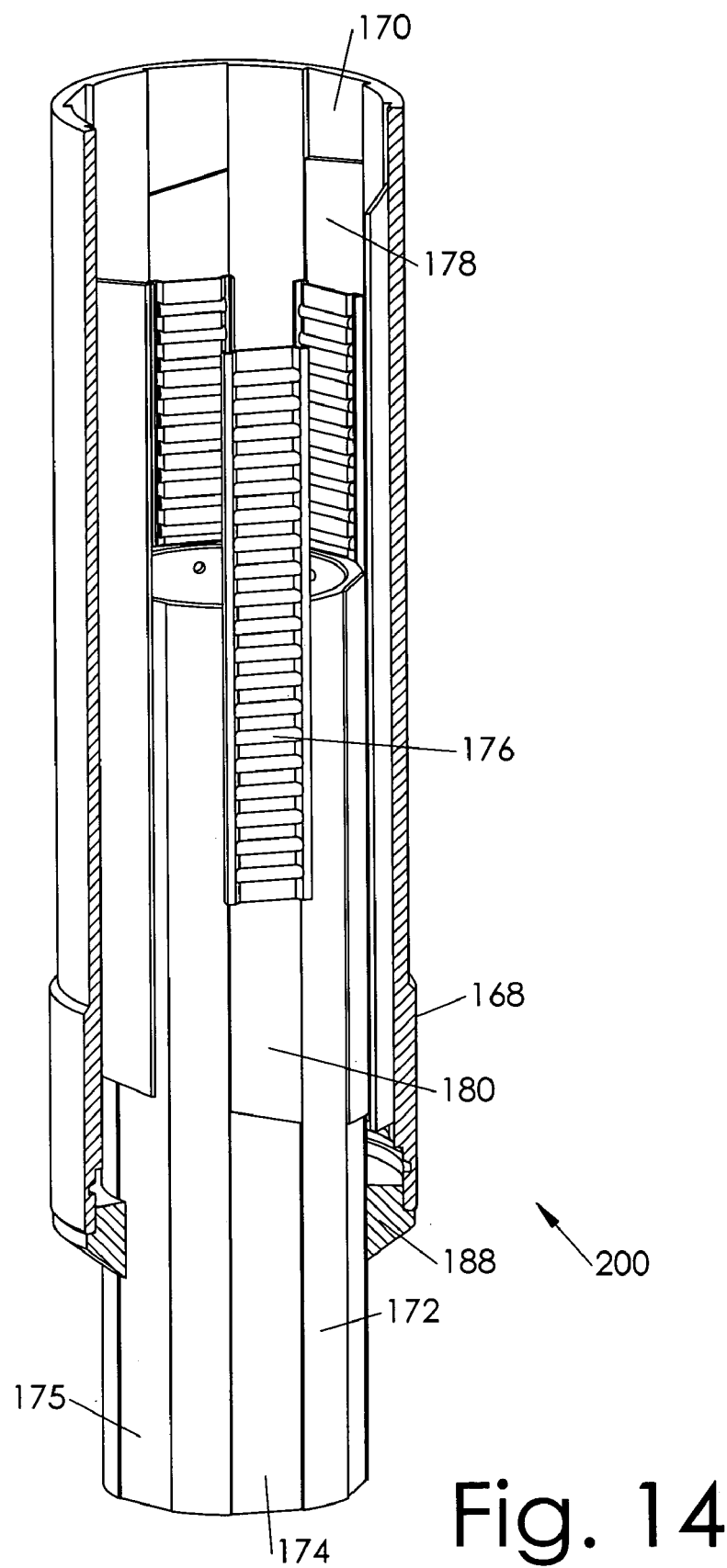
FIG. 14 shows a partially cross-sectioned view of a telescopic fork equipped with linear bearings.

FIG. 14 illustrates a portion of a linear bearing telescopic fork 200 according to one embodiment of this invention. The telescopic fork includes an outer fork tube 168 which includes a plurality of flats 170 disposed about its inner diameter. Hardened races 178 are disposed within or upon those flats, and are shown in partially truncated view for better visibility of the distinction between the flat and the race. An inner fork tube 172 is disposed within the outer fork tube and includes a plurality of flats 174 which are disposed about its outer diameter so as to be adjacent and substantially parallel with corresponding flats of the outer fork tube. Hardened races 180 are disposed within or upon these flats, and are shown in partially truncated view for better visibility of the flats and races. Linear bearings 176 are disposed between opposing races or flats. For clarity, the inner race has been omitted from one of the inner tube's flats 175, some of the bearings have been omitted, and some of the outer races have been omitted. A dust seal 188 is coupled to the end of the outer fork tube which overlaps the inner fork tube. In some embodiments, an old-school "right-side-up" fork configuration could be used, with the inner fork tube being coupled to the triple clamps and the outer fork tube being telescopically extendible and coupled to the front axle. But in the preferred embodiment, an "upside-down" fork configuration is used, as illustrated.

Figure 15:
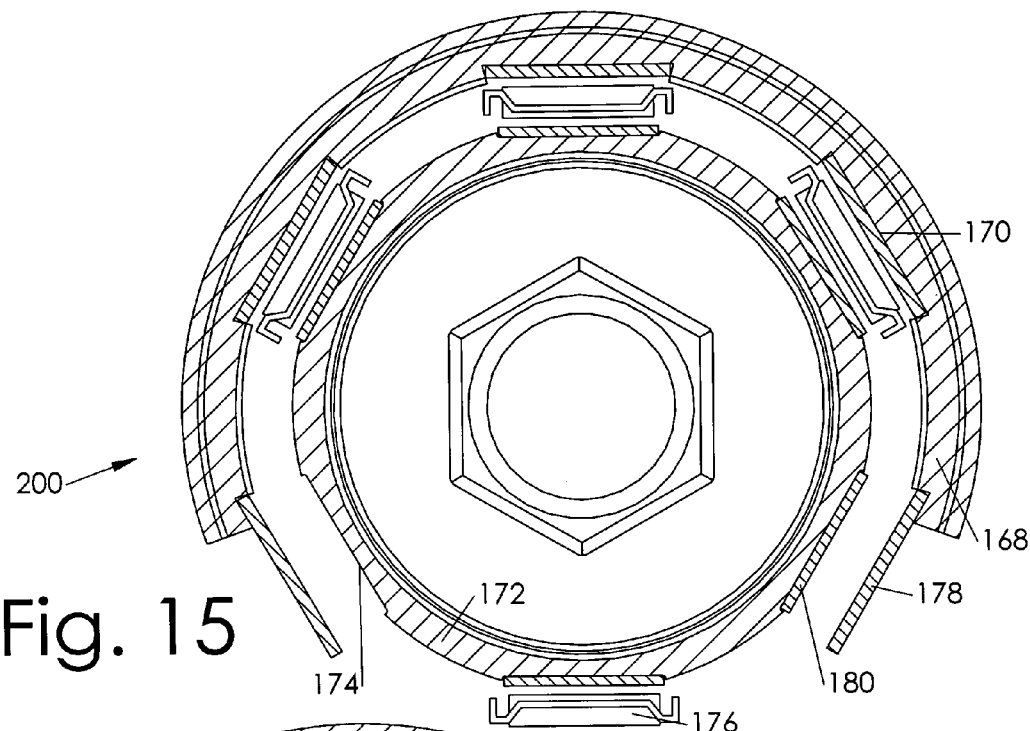
FIGS. 15 and 16 show top or axial views of a linear bearing telescopic fork having six and five sets of linear bearings, respectively

FIG. 15 illustrates an axial view of one embodiment of a telescopic fork 200, showing the outer fork tube 168 with its flats 170 and races 178, and the inner fork tube 172 with its flats 174 and races 180. Linear bearings 176 are disposed within opposing inner and outer races. In one embodiment, there are an even number of bearing sets, such as six.

Figure 16:
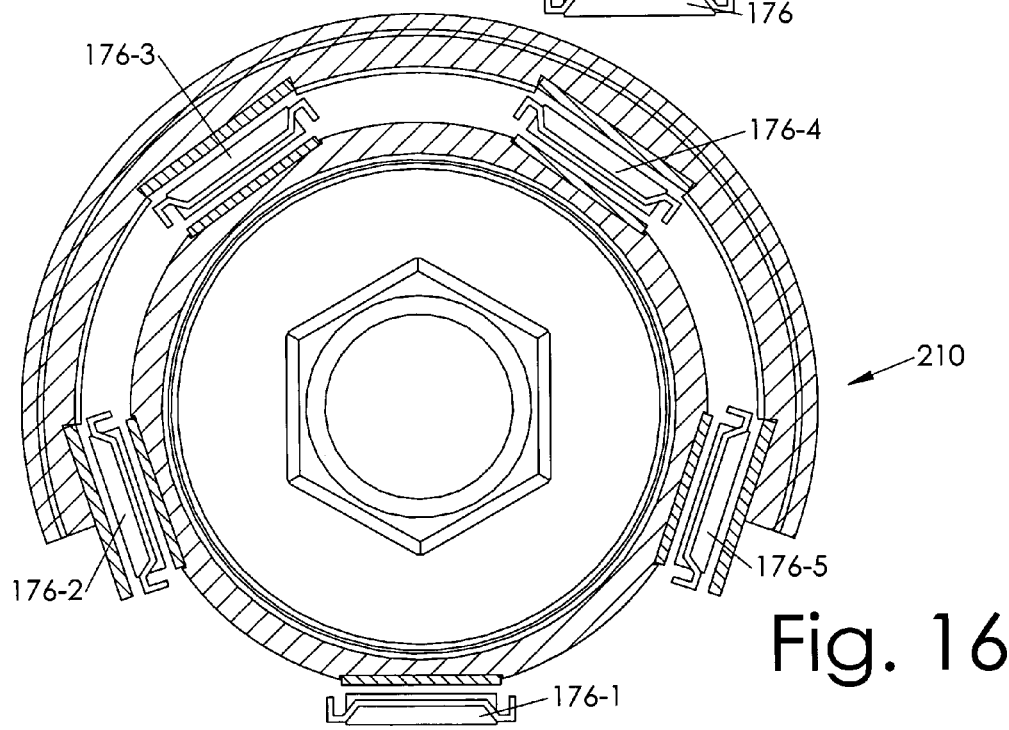
Figure 17:
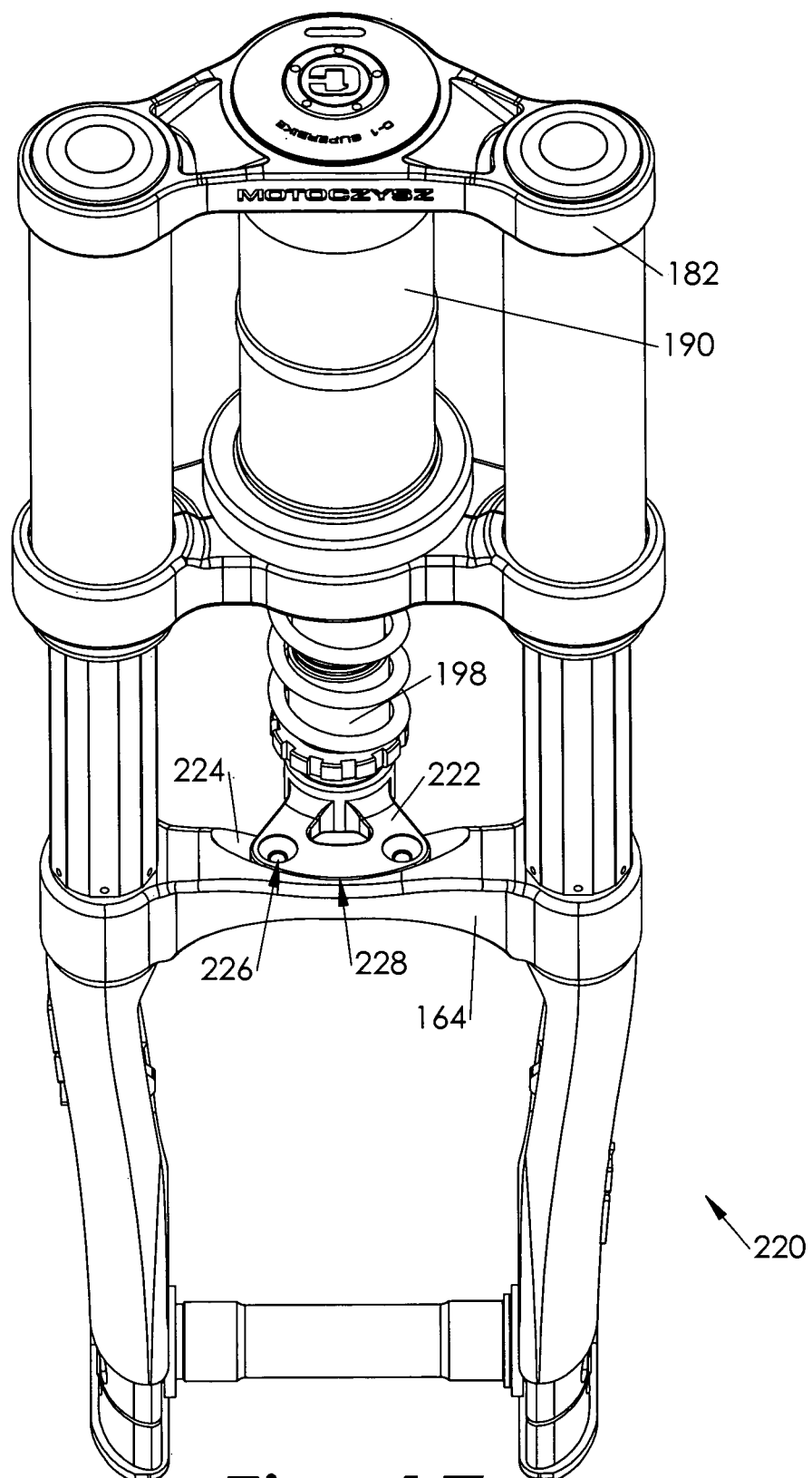
FIGS. 17–20 show one embodiment of a motorcycle front end having a shock mounting system according to another embodiment of this invention, demonstrating removal of the shock facilitated by rotation of the bracket which engages with the fork bridge, without requiring disassembly of the telescopic forks nor loosening of the triple clamps.
Figure 18:
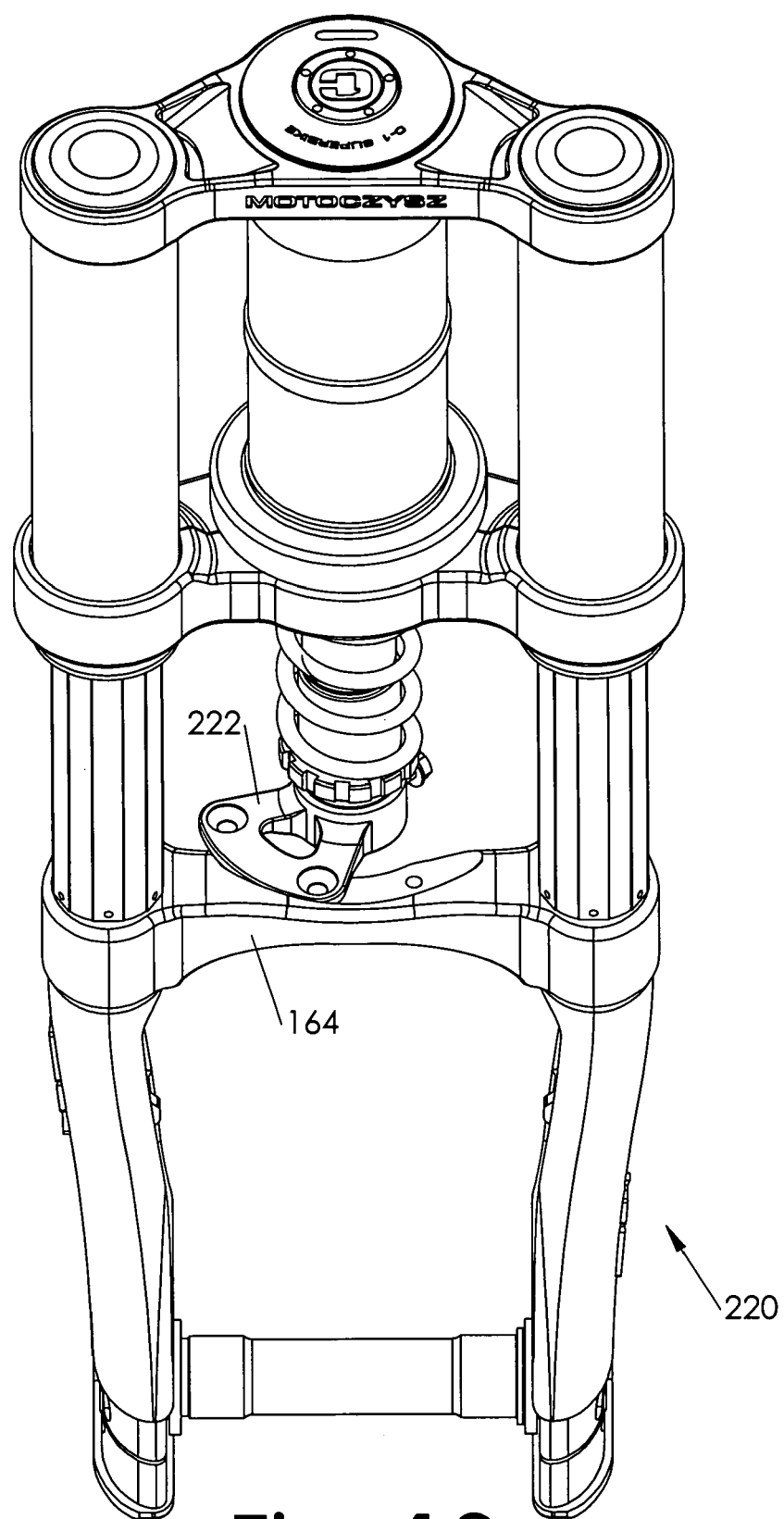
Figure 19:
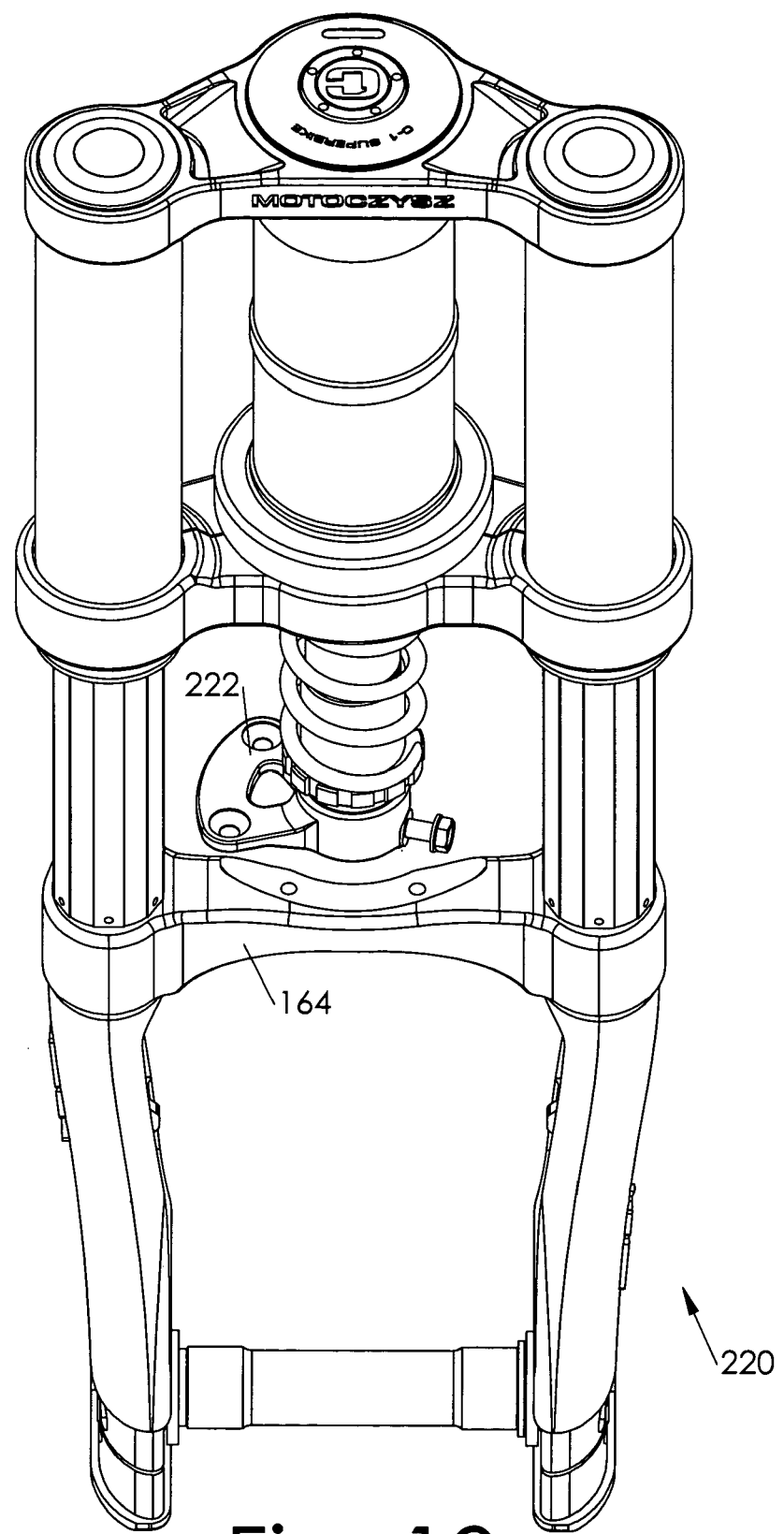
Figure 20:
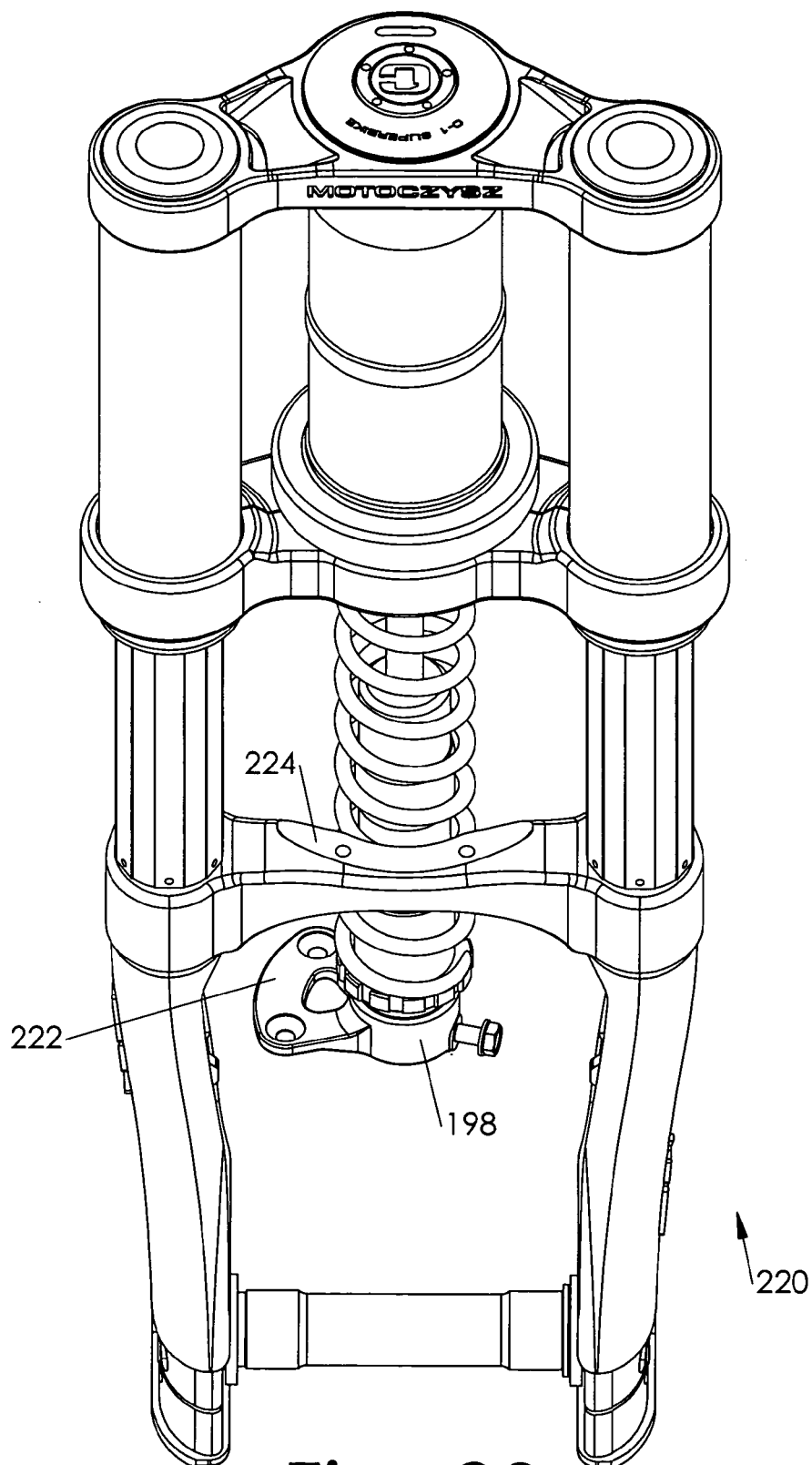

FIG. 16 illustrates an axial view of another embodiment of a telescopic fork 210 in which there are an odd number of bearing sets 176, such as five. In the embodiment shown in FIG. 15, there are pairs of opposed bearing sets which are disposed at 180° spacing around the axis of the fork. That configuration can in some instances cause increased sensitivity to manufacturing tolerance stackups, leading to difficulty in keeping equal preload on all bearing sets.

It has been found that, by using an odd number of bearings as shown in FIG. 16, the tolerance and preload problems are significantly reduced. The number of bearings can be selected according to the needs of the particular application at hand. In some cases, three may be adequate. In some cases, seven or more may be desirable. However, the preferred embodiment for use in the roadracing motorcycle of applicant's intended usage is to use five sets of bearings. Note that a "set" may include more than one cage of bearings in the same race channel.

The clocking or orientation of the bearings, whether an odd number or an even number, can in some cases also affect the performance of the forks. The heaviest loads that the bearings experience will generally be under fairly straight-line braking. Referring also to FIGS. 7 and 12, it will be understood that, under heavy braking, the road contact patch applies rearward force to the tire, which tends to drive the rearmost portion or side of the lower, inner fork tube against the rearmost lower portion or side of the upper, outer fork tube. This region acts then as a fulcrum, and the lower, inner fork tube levers over this fulcrum such that the frontmost portion or side of the upper end of the lower, inner fork tube is driven against the frontmost portion or side of the upper, outer fork tube.

It has been found desirable to clock the fork tubes with respect to the longitudinal axis of the motorcycle such that each fork is laterally symmetrical, such as shown in FIGS. 15 and 16 (in which it is assumed that the front of the motorcycle is facing e.g. the bottom of the page). In some embodiments, it is desirable that a bearing set be clocked at the frontmost position of the forks.

A needle bearing applied to roll axially up and down a cylindrical fork tube would lose the main advantage of the needle bearing, in that its load would be concentrated at the point where the cylindrical fork tube is tangent to and in direct contact with the needle bearing.

However, if flats are machined into the fork tube, the needle bearing can spread its load over its entire length.

If the fork tube is made of a soft material, such as light weight aluminum, even a needle bearing may not be sufficient to prevent eventual damage of the fork tube. If hardened steel races are placed in the flats, the needle bearing rides on the races and does not contact the fork tube. If corresponding flats are machined into the inner and outer fork tubes, the needle bearing does not touch either fork tube.

The fork tube can initially be fabricated as a cylinder, for manufacturing and tolerance purposes. The flats can then be machined in where needed. Advantageously, the flats can be machined in sufficiently far that the races do not extend outwardly beyond the original material of the cylinder; that is, the flats should be machined in at least as deep as the races are thick.

If the flats are machined in such that the elongated edges of the flats are somewhat under-cut, the flats can be slid in from one end, and cannot fall out radially. A screw or other means can be provided to prevent the races from sliding out axially.

As the inner fork tube moves in and out of the outer fork tube a given distance, the needle bearing moves half that distance. It rolls relatively up one tube, and relatively down the other tube. However, due to friction, vibration, and other factors, this does not mean that, over an extended period of operation, the needle bearing will return to exactly the same starting point. Over time, the needle bearing may tend to wander toward one end of the assembly. This is true even if there is some degree of initial preload in the assembly. Preload means that the nominal or theoretical space between the opposing flats (or races) of the inner and outer tubes is slightly smaller than the actual diameter of the needle bearing, and that the materials of the tubes and/or bearing are deformed under compression or tension upon assembly. Preload is desirable, to reduce "slop" in the assembly, but may contribute to increased wear and the like.

A plurality of needle bearings can be held in position relative to one another by a linear bearing cage. Such an assembly can simply be referred to as a linear bearing. The linear bearing should be long enough to provide adequate support for the overlapping, telescoping fork tubes.

It is advantageous to have an odd number of flats in each fork tube. If there were an even number, e.g. six, then there would be opposing pairs e.g. one and four, two and five, three and six. These opposing pairs increase the difficulty of assembly, increase wear of the assembly, and significantly increase the undesirable effects of preload such as the feel of notchiness which occurs in many kinds of bearings (including roller bearings) when they are overly preloaded or overly tightened. They also increase the bad effects of machining tolerance variations. In one embodiment, five flats and five corresponding sets of linear bearings has been found to be an excellent telescopic fork.

Having an inner fork tube whose outer surface is not purely cylindrical, significantly complicates such things as sealing the fork tube assembly. Conventional cylindrical oil seals are inadequate to keep the forks from leaking badly. However, if the fork tubes are merely telescopic sliders, and the hydraulic dampening mechanism is not located within the fork tubes (or is a self-sealed cartridge style assembly), there is no problem. The linear bearing fork tubes are especially well-suited for use in combination with appli-cant's co-pending invention which moves the hydraulics into the steering stem, leaving the forks to provide only telescopic movement. The springs could still be located in the fork tubes, or a spring could be in the steering stem.

Quick-Change Coaxial Front Shock

FIGS. 17–20 illustrate another embodiment of a motorcycle front end 220 in which a single coil-over shock 198 is disposed coaxially within the head tube 190. The top end of the shock is coupled to the upper triple claim 182 or to the steering tube (192, not visible), and the bottom end of the shock includes a bracket 222 which is coupled to a generally planar surface 224 of the fork bridge 164.

To rapidly swap out the shock, in order to replace it with another shock having different spring or damping parameters (e.g. stiffer spring, different oil, different shim stack, etc.), bolts (not shown) are removed from the mounting holes 226, and the bracket is rotated (FIG. 18) until it clears the fork brace (FIG. 19), then the shock can be threaded out of the steering tube. The replacement shock is inserted by reversing this process. In some embodiments, the surface 224 is recessed into the fork brace. In some embodiments, the front of the surface 224 has a curved edge 228 whose radius substantially matches a radius through which an outermost edge of the bracket swings as the shock is rotated.

Linear Bearing Retention

Figure 21:
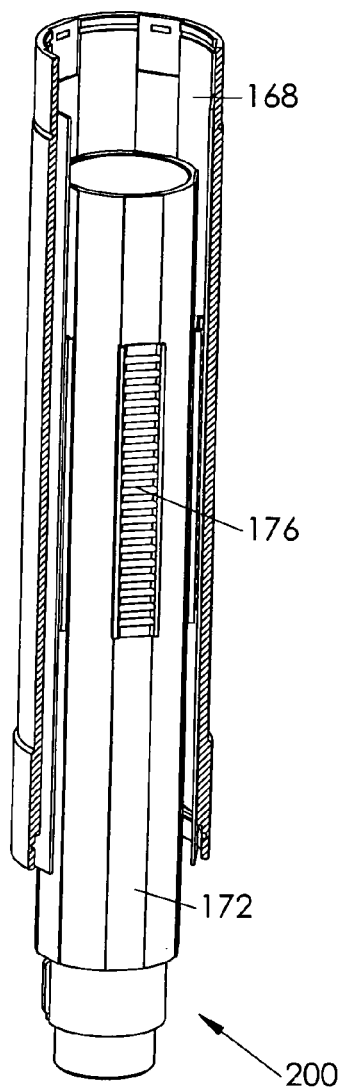
FIGS. 21–23 show the telescopic fork in a compressed, middle, and extended position, respectively, particularly showing relative motion of the linear bearings to the inner and outer fork tubes.
Figure 22:
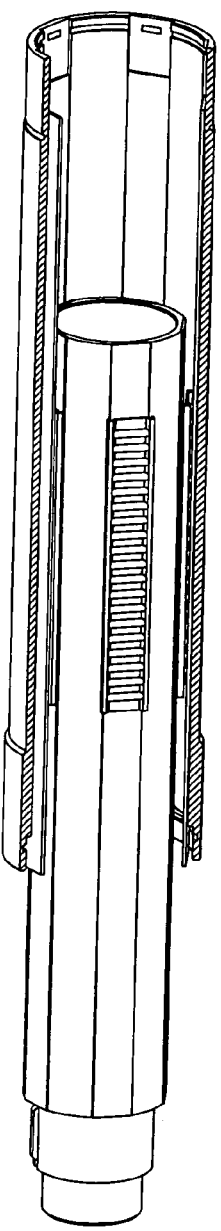
Figure 23:
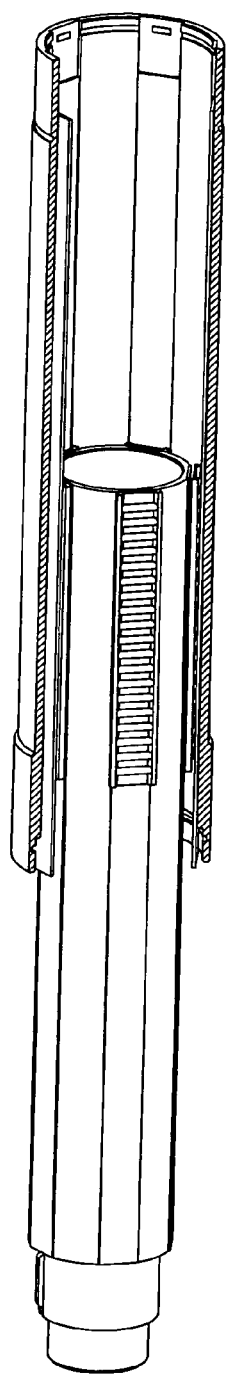

FIGS. 21–23 illustrate the telescopic action of the linear bearing fork 200. As the fork extends, with the inner fork tube 172 extending further and further out of the outer fork tube 168, the linear bearings 176 travel in that same direction but at half the speed and half the distance.

It is desirable, then, that the linear bearings have a length and a position such that they provide sufficient bearing surface area coupling the inner and outer fork tubes, throughout the range of travel of the fork tubes. In some embodiments, this will mean that the linear bearings should at all positions be fully engaged with the inner fork tube. In other embodiments, it may be acceptable for the linear bearings to partially extend beyond the inside end of the inner fork tube near full telescopic extension. In some embodiments, it may be desirable that the linear bearings never extend out of the overlapping end of the outer fork tube, while in other embodiments it may be acceptable if they protrude somewhat at full extension.

The length and positioning of the linear bearings can readily be determined by the skilled mechanic upon assembly of the fork, depending upon the particular demands of the application at hand.

In some applications, the linear bearings may tend to ratchet or wander over time, such that they do not always return to the same axial position when the forks are returned to the same telescopic position. This is in some measure dependent upon the preload, in some measure dependent upon the materials and strength of the fork tubes, and so forth. In some embodiments, it may be desirable to prevent such ratcheting or wandering.

Figure 24:
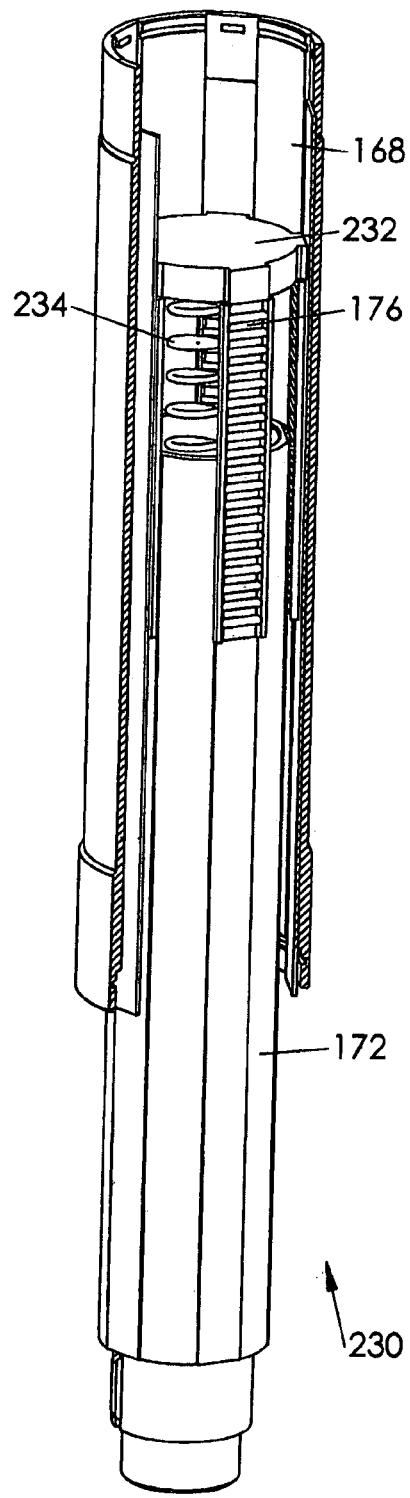
FIG. 24 shows another embodiment of a linear bearing fork tube having a spring-loaded bearing follower for keeping the linear bearings from ratcheting or wandering out of position.

FIG. 24 illustrates a linear bearing telescopic fork 230 which includes an inner fork tube 172 and an outer fork tube 168 and a plurality of linear bearings 176. A bearing follower 232 is disposed within the outer fork tube above the inner fork tube so as to be in contact with the upper ends of any linear bearings which ratchet far enough to extend beyond the upper end of the inner fork tube. The ratcheting is shown in a highly exaggerated fashion here, to illustrate the point. The follower provides axial pressure on the over-extending ends of the linear bearings, helping them to stay in position. In some embodiments, the weight of the follower is sufficient to accomplish this purpose. In other embodiments, a spring 234 or other device is used to provide pressure. The spring can be coupled to the inner fork tube, as shown, or it could be on the upper side of the follower and coupled to the outer fork tube or to the fork cap (not shown).

Figure 25:
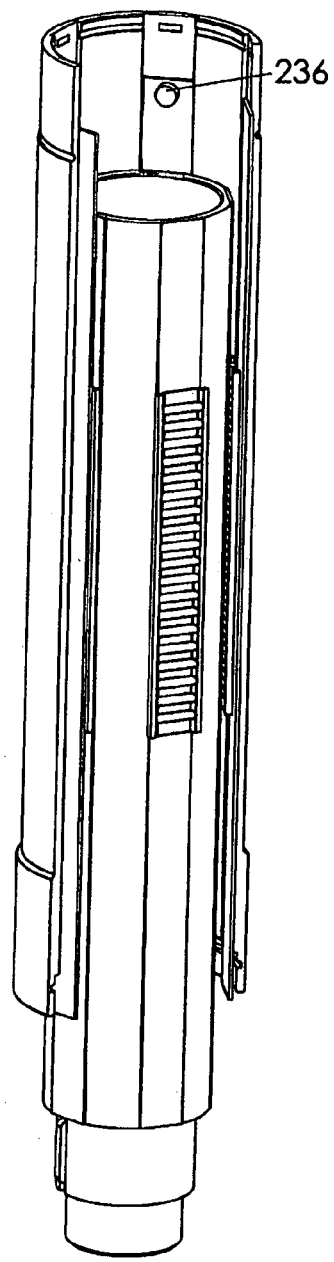
FIG. 25 shows another embodiment in which a bearing stop prevents the linear bearings from ratcheting or wandering out of position.

FIG. 25 illustrates another embodiment in which, rather than a follower, a simple stop 236 is employed. This is a less desirable embodiment, because the stop will only encounter the bearing at the bearing's most upward point of travel with respect to the outer fork tube, which is the bearing's most downward point of travel relative to the inner fork tube. In some embodiments, the stop can be placed farther down the outer tube, such that its lower edge is at the highest point that the bearing should travel; in the figure, it is shown at an extremely high position simply so that it is visible.

Axle Mounting Block Retention

FIGS. 26–28 illustrate the front end with three different trail blocks installed, producing three different amounts of trail. In FIG. 26, the fork bottom 20 is equipped with a first trail adjustment block 240A which provides a first amount of trail. For the sake of convenience, the trail is represented simplistically as it is related to the distance from the axial center of the front axle to the back of the trail adjustment block, rather than as a distance on the ground, but the reader will readily appreciate that the two are interrelated (because the front tire contact patch is behind the projected steering axis point on the ground, moving the front axle forward decreases trail, even though FIGS. 26–28 express a distance between the axle and a point on the fork bottom which increases as the axle is moved forward) (because the contact patch is behind the projected steering axis point on the ground). In the instance of FIG. 26, the trail block offset is 1.37 inches, corresponding to 4.0 inches of trail. The brake caliper 242 is mounted to the fork with a set of first caliper spacers 244A, which are sized to provide a particular distance from the center of the front axle to the brake pads (not shown). In FIG. 27, the fork bottom 20 is equipped with a second trail adjustment block 240B with a trail block offset of 1.58 inches, corresponding to 3.75 inches of trail. The brake caliper 242 is mounted with a set of second caliper spacers 244B which are sized to provide the same distance from the center of the front axle, which has been moved forward relative to its position in FIG. 26, to the brake pads, so the brake pads maintain the same relative position with respect to the brake rotors (not shown, but which will have moved forward along with the front axle). In FIG. 28, the fork bottom 20 is equipped with a third trail adjustment block 240C with a trail block offset of 1.83 inches, corresponding to 3.5 inches of trail, and the brake caliper is mounted without a spacer to keep the same distance from the axle to the brake pads.

It should again be noted that, in one embodiment, the trail adjustment blocks and their mating surface of the fork lower are configured such that the front axle is moved, by the various trail adjustment blocks, in a direction parallel to the ground, such that the front ride height is not changed by swapping out the different trail adjustment blocks. In one embodiment, this is accomplished by providing the trail adjustment block with a top surface and a bottom surface which are parallel, and by positioning the front axle hole at various positions, for the various trail adjustment blocks, which are a same distance from the bottom surface, for example. In other embodiments, other geometries may accomplish the same result.

The trail adjustment block may be tightened onto the axle, and the fork lower may be tightened onto the trail adjustment block, by one or more pinch bolts (not shown) which may advantageously be inserted upward through the bottom end of the fork lower through coaxial holes (not shown) through the portion of the fork lower which is below the trail adjustment block, the portion of the trail adjustment block which is below the pinch split, the portion of the trail adjustment block which is above the pinch split, and the portion of the fork lower which is above the trail adjustment block. In this instance, only the topmost or two topmost of these need to be threaded.

In one embodiment, the brake caliper is mounted not only "radially", but also with its radius parallel to the plane in which the various trail adjustment blocks move the front axle, to maintain a constant positioning of the brake pads and the brake rotor across the various trail settings. In one embodiment, the radius of the brake caliper mount is parallel to the ground.

Figure 29:
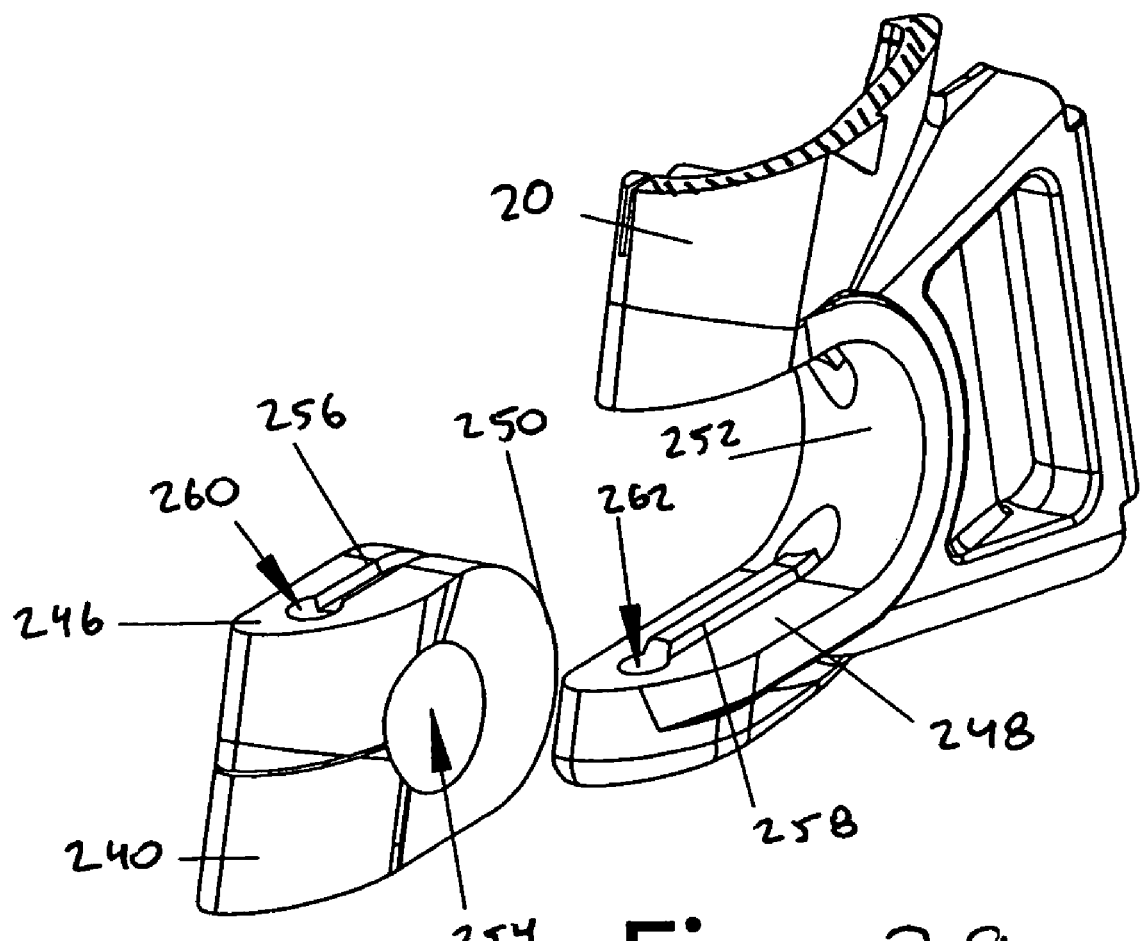
FIG. 29 shows the mating features of the trail adjustment block and the fork bottom.

FIG. 29 illustrates further details of the trail adjustment block 240 and the lower end of the fork bottom 20, specifically illustrating one mechanism by which axial alignment can be achieved. The fork bottom is illustrated in a truncated fashion, for simplicity. The trail adjustment block includes a top surface 246 and a parallel bottom surface (not visible) which, respectively, mate with a top surface (not visible) and a parallel bottom surface 248 of the fork. The back surface 250 of the trail adjustment block mates with a back surface 252 of the fork lower. These matings provide up-and-down and forward-backward alignment of the trail adjustment block with respect to the fork lower. In one embodiment, in order to provide positive and consistent lateral alignment (with respect to the front axle, not shown, but centered in the axle mounting hole 254), the upper and lower surfaces of the trail adjustment block are adapted with parallel grooves 256 which mate with corresponding parallel ridges 258 on the lower and upper surfaces of the receiving recess of the fork bottom. Other embodiments are certainly viable, such as swapping the grooves and the ridges, or one of each, or by using mounting pins and holes, or simply by using the corresponding pinch bolt holes 260, 262 and the pinch bolt (not shown).

The ridge-and-groove arrangement prevents the trail adjust block from moving axially with respect to the front axle.

FIG. 30 illustrates this arrangement in partial cross-section view, with only the trail adjust block and the ridge cross-sectioned, to illustrate their engagement. The left and right shoulders of the fork bottom's mating ridges 258 engage with corresponding left and right shoulders of the trail adjust block's grooves 256.

FIG. 31 illustrates another, simpler embodiment. Because the front wheel and axle spacers (not shown) prevent significant inward movement of the trail adjust block 272, all the fork bottom 270 needs to do is to prevent the trail adjust block from slipping axially outward or longitudinally forward. The fork bottom includes a ridge 274 which includes a shoulder at its inward edge, and the trail adjust block includes a ridge 276 which includes a shoulder at its outward edge. These shoulders engage and prevent the trail adjust block from slipping outward. A pinch bolt hole 278 can be used to retain the trail adjust block, preventing longitudinally forward movement relative to the fork bottom. This simplifies the machining of the fork bottom and trail adjust block.

Gusseted Fork Bottom

Figure 32:
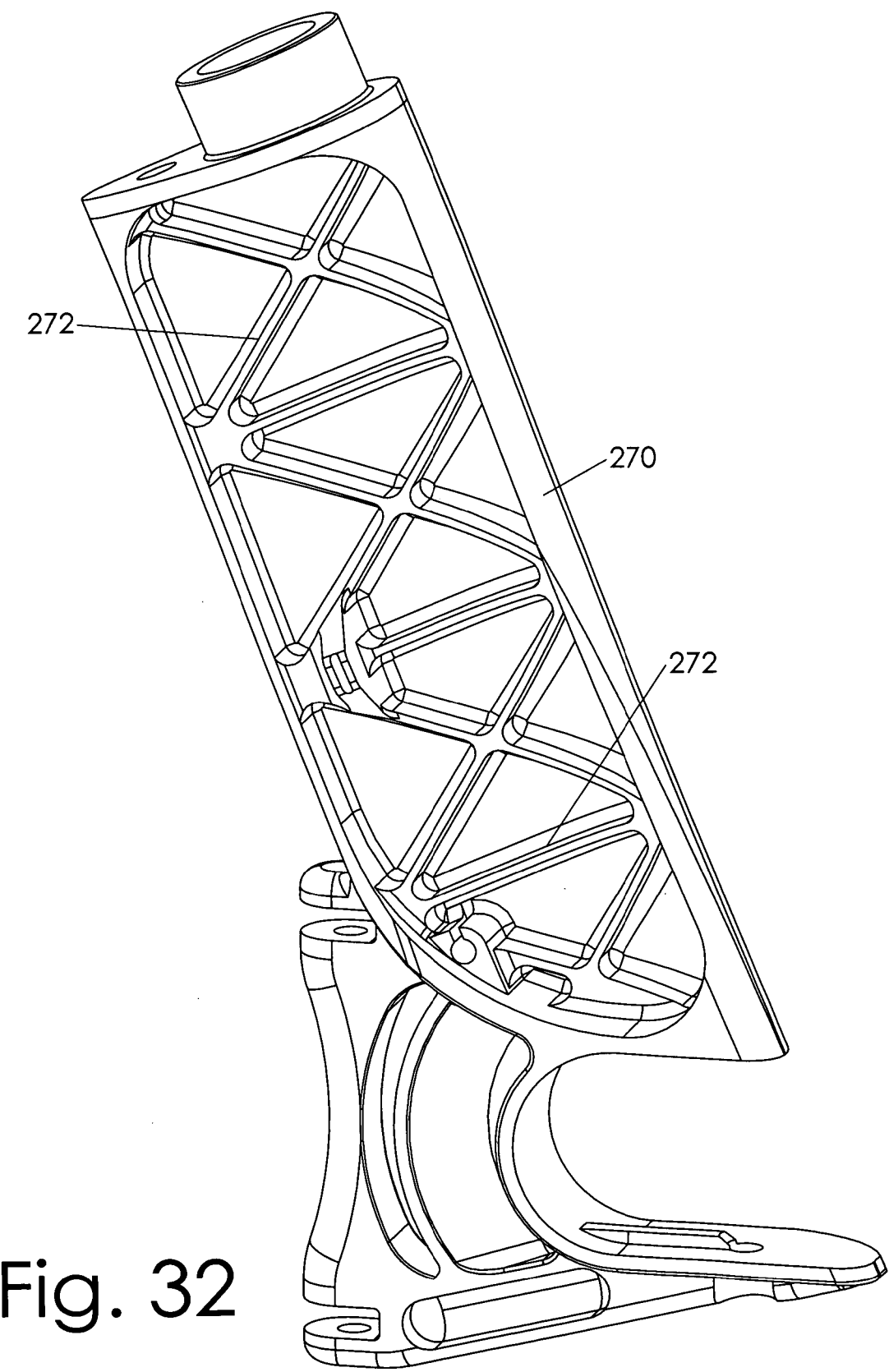
FIG. 32 shows another embodiment of a gusseted fork bottom.

FIG. 32 illustrates another embodiment of a fork bottom 270 which includes an elongated C-beam cross-sectional shape for high longitudinal rigidity with some measure of lateral flexibility. The inner face of the fork lower has been beefed up with a plurality of cross-webbed gussets 272. The thickness and lateral depth of the gussets impacts both the lateral and longitudinal stiffness, and can be selected according to the needs of the application at hand.

CONCLUSION

The reader will readily appreciate that having the suspension components mounted coaxially with the steering head provides several significant advantages. For example: the moment of rotational inertia of the front end is reduced, versus that of a conventional front end in which the suspension components are located out in the fork tubes; only a single set of suspension components is required, and yet the suspension has the same affect at each side of the front axle, whereas putting a single set of components in e.g. only the left fork of a conventional front end would produce disastrous results; preload, rebound damping, compression damping, and ride height adjustments can be made with a single adjustment each, versus the two adjustments each that are required in a conventional front end, and can be done without loosening the forks in the triple clamps; suspension settings cannot accidentally be different on the two sides of the front end, whereas this is a constant danger with a conventional front end; stiction is reduced; and yet the familiar and desirable look and feel of a conventional dual fork front end are retained. Furthermore, it may often be the case that the total mass of the required suspension is lower when using the present invention, than when using a conventional front end.

While the invention has been described with reference to its use in a motorcycle, the invention is not limited to motorcycles, but can be used in bicycles, automobiles, and other vehicles. And while the invention has been shown as using an "upside-down" fork, it may alternatively be used with a "right-side-up" fork. Some components have been illustrated as being of monolithic construction, while other components have been illustrated as being separate components coupled together. The reader will readily appreciate that the designer may elect, within the scope of this invention, to split some components into separate sub-components, or to combine various components into a monolithic whole. The reader will further appreciate that the invention may be practiced in a "single-sided" front end, such as that found on some bicycles which have only a single fork. The term "triple clamp" should not necessarily be interpreted to mean that two forks are required with the steering tube. The presence of one or more suspension components coaxial with the steering axis does not necessarily prohibit the additional presence of one or more suspension components elsewhere, such as within the forks.

The sliding-tube forks may be empty, containing neither springs nor dampers, and may thus be said to have substantially inert suspension characteristics. In some embodiments, the suspension components could be located externally to the outer steering tube, rather than inside it.

While it might, at first glance, be assumed to be a negative that the head tube must, in the present invention, be significantly larger than in a conventional front end, the opposite is actually true. Having a very large diameter head tube, with very large diameter bearings and so forth, reduces frame torque and makes the frame stronger, especially at the points at which the rest of the frame joins the head tube.

While the invention has been described with reference to its use in a motorcycle, the invention is not limited to motorcycles, but can be used in bicycles, automobiles, and other vehicles. And while the invention has been shown as using an "upside-down" fork, it may alternatively be used with a "right-side-up" fork. Some components have been illustrated as being of monolithic construction, while other components have been illustrated as being separate components coupled together. The reader will readily appreciate that the designer may elect, within the scope of this invention, to split some components into separate sub-components, or to combine various components into a monolithic whole. For example, the lower fork tube and the fork bottom could be formed as one integral component. The fork bottom has been shown having a length such that it extends to or above the top of the front tire, but the invention is not thus limited; rather, any suitable length fork bottom may be used, so long as it has meaningfully different stiffness in the longitudinal and lateral directions (in contrast to the small mounting structures, typically machined from billet, which are found on the bottom of conventional upside-down forks).

The reader will further appreciate that the invention may be practiced in a suspension having only a single fork, and that the "triple clamps" will not in that case have means for coupling a third tube, but only the head tube and the upper fork tube.

The fork and the trail adjustment block have been illustrated in a configuration in which the trail adjustment block slips into the front of the fork. In other embodiments, a different mating system could be employed. For example, instead of an indentation or receptacle formed into the front of the fork, the fork could have a hole extending laterally through it, or, in other words, there could be fork material in front of the receptacle, and the trail adjustment block would be inserted laterally rather than longitudinally. Alternatively, the receptacle could be oriented generally downward, such that the fork bottom is lowered onto the trail adjustment block.

When one component is said to be "adjacent" another component, it should not be interpreted to mean that there is absolutely nothing between the two components, only that they are in the order indicated. The various features illustrated in the figures may be combined in many ways, and should not be interpreted as though limited to the specific embodiments in which they were explained and shown. Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A motorcycle having a frame, a front axle, and a front wheel rotatably coupled to the front axle, the motorcycle further having a front end coupling the front axle to the frame, the front end having spring and dampening characteristics and comprising:

a pair of telescopic forks each including,
an inner fork tube having a plurality of axially extending flats on an outer surface of the inner fork tube,
an outer fork tube having a plurality of axially extending flats on an inner surface of the outer fork tube, a plurality of linear bearings each disposed between a respective one of the flats of the inner fork tube and a corresponding respective one of the flats of the outer fork tube, wherein the inner fork tube is telescopically disposed within the outer fork tube and coupled thereto by the linear bearings and wherein the telescopic tubes are substantially inert sliders;

an upper triple clamp coupled to upper ones of the fork tubes of the telescopic forks and coupled to the frame;

a fork bridge coupled to lower ones of the fork tubes of the telescopic forks;

a coil-over shock coupled to the fork bridge and to the upper triple clamp and disposed within a head tube of the frame and wherein the coil-over shock provides substantially all of the spring and dampening characteristics of the front end; and a radially extending bracket coupling a lower end of the coil-over shock to the fork bridge;

wherein, when the bracket is unbolted from the fork bridge, the bracket can be rotated out of engagement with the fork bridge;

whereby the coil-over shock can be removed from the motorcycle without alteration or disassembly of the telescopic forks nor the upper triple clamp.

2. A motorcycle having a frame, a front axle, and a front wheel rotatably coupled to the front axle, the motorcycle further having a front end coupling the front axle to the frame, the front end having spring and dampening characteristics and comprising:

a pair of telescopic forks each including an inner fork tube and an outer fork tube, wherein the inner fork tube is telescopically disposed within the outer fork tube;

an upper triple clamp coupled to upper ones of the fork tubes of the telescopic forks and coupled to the frame;

a fork bridge coupled to lower ones of the fork tubes of the telescopic forks;

a coil-over shock coupled to the fork bridge and to the upper triple clamp and disposed within a head tube of the frame and wherein the coil-over shock provides substantially all of the spring and dampening characteristics of the front end; and a radially extending bracket coupling a lower end of the coil-over shock to the fork bridge;

wherein, when the bracket is unbolted from the fork bridge, the bracket can be rotated out of engagement with the fork bridge;

whereby the coil-over shock can be removed from the motorcycle without alteration or disassembly of the telescopic forks or the upper triple clamp.

3. The motorcycle of claim 2 wherein the fork bridge includes a recess to accommodate the bracket.

* * * * *